May 5, 1953　　　H. OSTERBERG ET AL　　　2,637,242
CONDENSER LENS SYSTEM FOR PROJECTORS
Filed Feb. 8, 1949　　　　　　　　　　　　　3 Sheets-Sheet 1
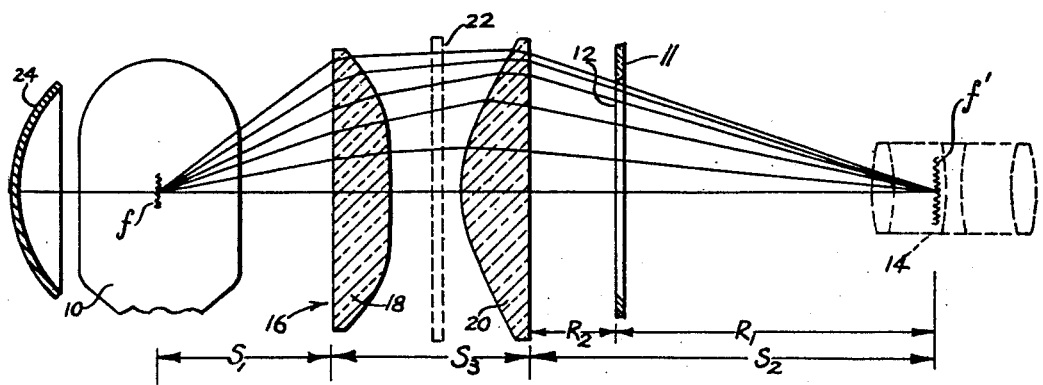
Fig. 1
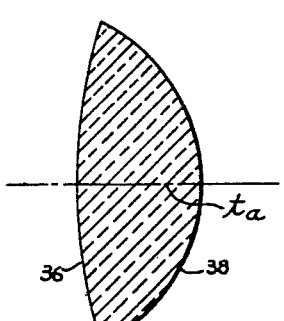
Fig. 4　　Fig. 8
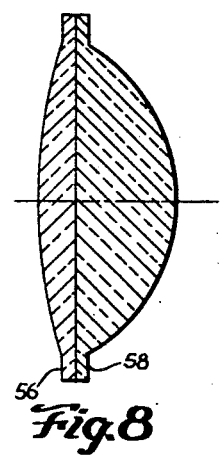
Fig. 5
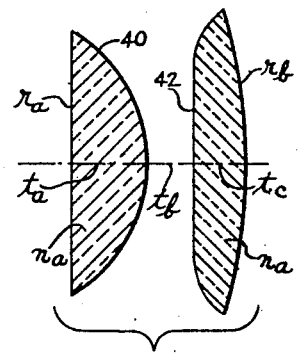
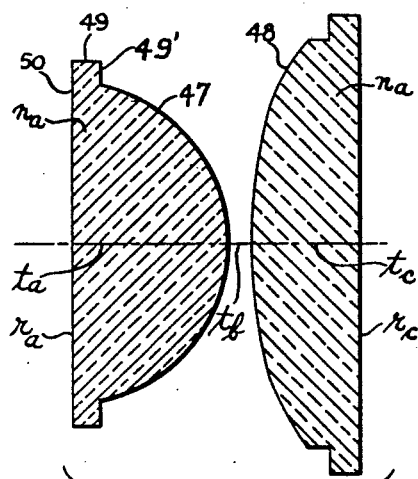
Fig. 6
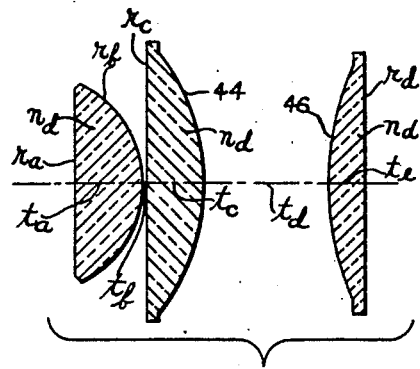
Fig. 7
INVENTORS
Rudolf K. Luneburg
Harold Osterberg
BY Robert M. Mueller
ATTORNEYS May 5, 1953  H. OSTERBERG ET AL  2,637,242
CONDENSER LENS SYSTEM FOR PROJECTORS
Filed Feb. 8, 1949  3 Sheets-Sheet 2

INVENTORS
Rudolf K. Luneburg
Harold Osterberg
Robert M. Muller
BY
ATTORNEYS

INVENTORS
Rudolf K. Luneburg
Harold Osterberg
Robert M. Muller

Patented May 5, 1953

2,637,242

UNITED STATES PATENT OFFICE 2,637,242

CONDENSER LENS SYSTEM FOR PROJECTORS

Harold Osterberg and Robert M. Muller, Buffalo, N. Y., and Rudolf K. Luneburg, Los Angeles, Calif., assignors to American Optical Company, Southbridge, Mass., a voluntary association of Massachusetts Application February 8, 1949, Serial No. 75,112

26 Claims. (Cl. 88—24)

This invention relates to condenser lens systems employing one or more lens elements and more particularly to such lens systems having pairs of aspherically shaped surfaces of such predetermined optical design that such systems provide controlled illumination for all parts of a film gate, projection aperture or the like associated therewith while directing substantially all of the transmitted light in a predetermined direction so as to fill the aperture of a projection objective of the instrument containing the condenser system. While condenser lens systems made in accordance with the present invention are useful in a variety of applications, they are of particular usefulness in projectors and the like in which relatively high speed condenser systems are desirable.

Condenser lens systems employing plane and spherically shaped lens elements have long been used in projection equipment as a convenient means for collecting and concentrating light from the light source thereof toward a film or the like at the projection aperture of the instrument. Because more light can be supplied at the projection aperture without increasing the size of the light source by increasing the numerical aperture of the condenser lens system, such systems are usually made as high speed as conveniently possible consistent with the choice of objectives, size of filament, and similar physical properties of such a projection system. This increased aperture introduces considerable spherical aberration, even in a well designed spherical system, at the image plane of the light source. To provide additional lens elements to reduce such aberrations will materially increase the expense of the condenser system and of the instrument, and might even necessitate larger over all dimensions in such an instrument. Attempts have been made, heretofore, to use an aspheric surface or surfaces in condenser lens systems for reducing spherical aberration but such have not proved as satisfactory as might be desired because, for example, of the expense incurred in the grinding and polishing of these elements. Furthermore even in such systems of earlier construction, substantially even illumination of all parts of the picture being projected by the instrument onto an associated viewing screen has not been obtained.

It should be noted that a number of factors or conditions materially affect the quality of the illumination of the picture being projected into a viewing screen. One of such conditions of material importance is that due to the vignetting effect of the particular projection objective provided in the instrument, and such is often responsible for a considerable loss of light or "falling off" of the illumination toward the edges of the viewing screen, as compared with the central intensity thereof. Another factor which should be considered in the design of a condenser lens system for a projector, or the like, is the characteristic feature of conventional projection bulbs wherein, even though a relatively small filament or light source is employed, such bulbs generally have definite transverse filament planes and accordingly each radiates more light in a direction normal to this plane than in other directions. This tends to increase the brightness near the center of the projection aperture and thus the center illumination of the screen, as compared with marginal regions thereof. In addition thereto, oblique rays are not transmitted as readily through lens elements as are the more nearly normal centrally disposed rays, due, for example, to reflections from the lens surfaces. The well-known cosine law of emission from small portions of the lamp filament causes more light to be radiated in a direction perpendicular to the plane of the plane of the filament and thus tends further to increase the illumination at the center of the projection aperture and also at the center of the screen. Another factor influencing the illumination upon the screen results from the fact that most film, and similar picture-carrying material, scatter light considerably with the result that smaller percentages of the scattered light from points near the edge of a film (at the projection aperture) reach the objective than from points nearer the center or axis of the system. This is particularly true of certain photographic enlargers in which a diffusing plate or the like is placed behind the film and acts as a light scatterer.

For these and other reasons, it has been found desirable to provide a condenser lens system which will provide controlled illumination over all portions of an associated projection aperture, which illumination may be substantially uniform throughout, or which may be increaesd from the center to the edges of the projection aperture in a predetermined or controlled manner, as desired, to compensate for the various factors and light losses mentioned above. A further requisite of a good condenser lens system is not only that the illumination at the projection aperture be of controlled intensity over all parts of the aperture but also that as many of the rays as possible emerging from the condenser lens system should travel through the projection aperture in such directions as to enter the associated objective, that these rays should form an image of the light source therein substantially at the entrance pupil of the objective, and that this image should be of such magnification as to fill the first lens element of the objective.

It has been found that the relative illumination from edge to center of a projection aperture of a projector, enlarger or the like, can be materially increased and advantageously controlled in predetermined manner by means of a condenser lens system made in accordance with the present invention. Such desirable results are effected by providing a condenser lens system (whether such system employs one, two or even more lens elements) and providing upon said element or elements a pair of co-related aspheric lens surfaces so spaced and so shaped relative to each other, and to the other optical properties of the system, that a predetermined controlled distribution of illumination for all parts of an associated projection aperture and focusing of the rays at a predetermined image plane will be provided. These co-related aspheric surfaces may be arbitrarily disposed upon the opposite sides of a single lens element, or upon the adjacent surfaces of adjacent elements, or even upon lens elements separated by intermediate plano or refracting surfaces if desired; it being appreciated, however, that the forms of these aspheric surfaces will depend upon the locations which are chosen and that in the last cited example, a more tedious problem of lens designing would be required.

It is, accordingly, an object of the present invention to provide an improved condenser lens system, or the like, arranged to give controlled illumination at all parts of a projection aperture associated therewith, as well as controlled direction for the rays transmitted by the condenser system, while providing predetermined magnification with substantially no spherical aberration in the image formed thereby. The invention also includes the method of providing controlled illumination at a projection aperture and/or upon a viewing screen associated therewith.

It is an additional object of the invention to provide a condenser lens system of the character described and a method for producing large numbers of such condenser lens systems in a rapid and inexpensive manner, and which systems when so produced will give, when used in the projectors for which they are designed, highly acceptable results even though certain surface portions thereof may not be of best optical quality.

Other objects and advantages of the invention will become apparent from the detailed description which follows when taken in conjunction with the accompanying drawings, in which:

Fig. 1 is a diagrammatic showing of the optical system of an instrument, such as a movie or slide projector, enlarger or the like, embodying a light source, a film gate or aperture, an objective, and a condenser lens system embodying the present invention;

Fig. 4 is a cross-sectional view of a single element condenser lens system embodying the present invention and provided with a pair of aspheric surfaces;

Figs. 5 and 6 show in cross section, respectively, two forms of condenser lens systems embodying the invention and comprising pairs of lens elements having co-related aspheric surfaces;

Fig. 7 shows a three element condenser lens system embodying the invention;

Fig. 8 shows a slight modification of the condenser lens system of Fig. 4;

Figure 2:
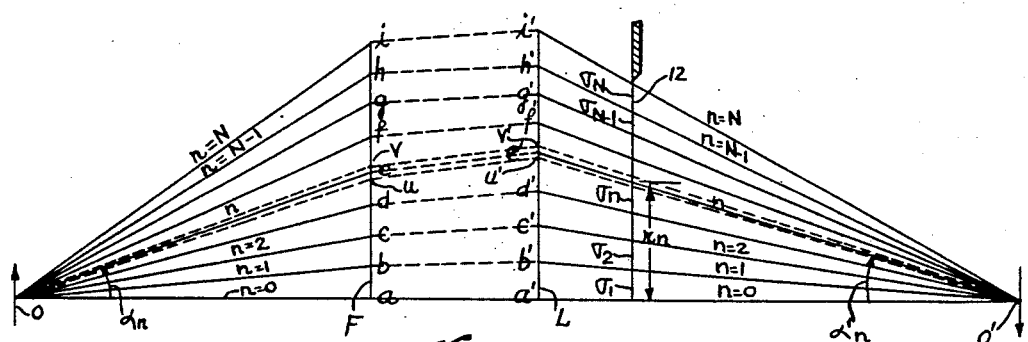
Figs. 2 and 3 are sketches which may be found useful in obtaining a clear understanding of the invention.

Referring to the drawing in detail, in Fig. 1 is shown diagrammatically the optical system of a slide projector or equivalent projection apparatus comprising a light source 10, a film gate 11 having a projection aperture 12 at which the picture carrying medium may be located during projection of an image thereof by means of a conventional projection objective 14. A condenser lens system 16 is shown between the light source 10 and the projection aperture 12, and this condenser lens system, instead of employing conventional lens elements having plane or spherical surfaces, employs condenser lens elements of novel design made in accordance with the present invention.

The condenser lens system 16, as here shown, is provided with a pair of co-related aspheric lens surfaces disposed upon the adjacent surfaces of a pair of plano-convex condenser lens elements 18 and 20. It is not unusual to employ in projectors and the like generating considerable amounts of heat a heat screen or filter made of heat absorbing glass for absorbing the heat rays from the projection beam. Such a heat screen may be used, if desired, between the lens elements as indicated by dotted lines at 22 without materially affecting the design of the condenser system since same would have no appreciable optical power or effect. This screen may be plano or meniscus in shape as desired. A conventional spherical reflector is indicated at 24.

Light from a small high intensity filament $f$ of the light source 10 is so concentrated by the condenser lens system 16 that it passes through the projection aperture 12 and into the end of the objective 14 to form an image $f'$ of the filament of suitable predetermined magnification which will be preferably of sufficient size to completely fill the first lens element of the objective. If the objective is adjustable for focussing, as is usually the case, this filling of the objective will be such as to care for all predetermined positions of focussing adjustment of the objective. The image $f'$ will be formed preferably substantially at the entrance pupil of the objective. The objective 14, in turn, is arranged to image a film, when positioned at the projection aperture 12, upon a viewing screen (not shown) located at a suitable working distance from the projector.

It will be obvious that, for best picture viewing purposes, all parts of the screen should be supplied with proper illumination. If we consider the screen illumination when no picture carrying medium is at the projection aperture, it will be appreciated that this screen illumination should be substantially uniform over all parts thereof, or should so nearly approach this condition that no "falling off" effect of illumination from center to edge of the screen will be sensed by an observer during the projection of pictures and the like. The condenser lens system of the present invention can be so designed that these desirable conditions of screen illumination can be readily obtained. It should be noted, however, that in some instruments only a substantially uniform illumination at the projection aperture is needed for good screen illumination while in other instruments, especially in ones employing objectives which vignette appreciably, the illumination at the projection aperture should materially increase toward the outer edges, as compared to the center illumination thereof. It is not uncommon in some present day projectors using high speed condenser lens systems to have a 15 or 20% decrease in intensity toward the edges of the viewing screen, and in some cases the edge illumination may drop off as much as 40% or more. Such conditions can be readily ascertained for any projector by taking a series of readings across the viewing screen with the aid of a conventional photoelectric light meter or the like.

In designing a condenser lens system for a slide projector or the like certain factors will be pre-established by the size and power of the instrument desired, the size of filament, the film aperture required, the type of objective to be employed, etc., and these factors may be based somewhat upon past experience in the designing of other instruments. For example, in Fig. 1 the desired size of the aperture 12 will be known and an objective 14 of suitable characteristics to function therewith will be selected. When such have been decided upon, the distance $R_1$ from the filament image $f'$ to the aperture 12 may be established. The distance $R_2$ from the last surface of the condenser to the aperture 12 may then be determined and this film-to-condenser separation is usually controlled by other factors of the instrument such as space required for air cooling, lens and film gate supporting elements etc. It is pointed out, furthermore, that when $R_2$ is large, slight local irregularities (if any) upon the aspheric surfaces of the condenser lens element or elements will not materially impair the overall quality of illumination provided by the system.

When the image distance $S_2$ has been established by the sum of the distances $R_1$ and $R_2$, the distances $S_1$ from the first surface of the condenser system to the filament $f$ and the necessary space $S_3$ for the condenser lens system may then be selected. Of course, condenser elements of sufficient diameter must be used to light all parts of the projection aperture. Generally speaking, the diameter of the condenser should be at least great enough so that the path of a ray, for example, traced backwardly from a point at the bottom of the filament image $f'$ of Fig. 1 and through the upper and outermost corner in the clear aperture 12 (which is generally rectangular) will be intercepted and refracted by the condenser lens system approximately toward the corresponding point on the filament $f$. On the other hand, they should not be of greater size than necessary since this would increase the expense of same. When the particular light source to be employed at 10 is also established, it can be readily decided what magnification will be needed in the condenser lens system to provide an image which will substantially fill the entrance pupil of the objective 14.

If substantially all of the light received by a high speed condenser lens system can be so controlled as to cause same to pass therethrough and enter an associated objective, a relatively high level of illumination relatively free from discolorations on the screen might be obtained. For this reason, some condenser lens designs have been highly corrected for spherical aberration. Such, however, will not necessarily give (as has already been pointed out) the distribution of light at the film aperture or at the viewing screen most desired. In fact, some earlier systems have even employed aspheric surfaces to give a minimum of spherical aberration and were of such a character that the well-known Abbe sine condition (sin $a = M$ sin $a'$) was substantially satisfied. (In the above formula, $a$ is the angle any axial ray in the object space bears to the optical axis of the system, $a'$ is the angle the same ray in the image space bears to the optical axis and $M$ is the magnification for the system, assuming of course a condition of zero spherical aberration.) While a system satisfying this condition gave a good image of the light source with proper magnification, and was fairly well corrected for coma, it did not give proper film aperture or screen illumination.

The present invention, however, makes possible an improved condenser by providing a lens system which is well corrected for spherical aberration and in which deviations from the Abbe sine condition are purposely introduced in such a manner (which will be described presently) as to produce controlled illumination over all parts of the aperture 12. Fig. 2 shows a small light source O having axial symmetry about the optical axis, the projection aperture 12, and light rays which diverge from source O and which are to be converged in the present example by a two-element condenser lens system whose first and last surfaces are respectively F and L to form an image O' of O in such a manner that the Abbe sine condition is substantially satisfied and thus a system in which spherical aberration is substantially or practically absent therefrom. The light rays leaving source O are grouped into N number of solid conical shells separated by rays $n=0$, $n=1$, $n=2$, etc. up to $n=N$. These conical cones will be called the entrance cones. The condenser lens system with exterior surfaces F and L, but whose two aspheric interior surfaces have yet to be determined, serve to continue the rays $On$ into the rays $nO'$, $n=0$, $n=1$, $n=2$, $n=3$, ... $N$ in the image space. For example, ray $Od$ is conditioned to $dd'$ and to $d'O'$. It is convenient to define the $n$th entrance cone as the cone enclosed by the rays $n$ and $(n-1)$. The light in this cone passes through the annular area or zone $\sigma_n$ of the aperture 12. The same relation may be considered for all the rays, $n=1, 2, 3, \ldots N$. Let the amount of light flux in the $n$th entrance cone be denoted by $\phi_n$. If the condenser transmits the flux in all of the entrance cones with negligible loss of flux, the average illumination $E_n$ of the $n$th zone $\sigma_n$ in the aperture 12 can be given by the formula:

$$E_n = \frac{\phi_n}{\sigma_n}, n=1, 2, 3, \ldots N \qquad (1)$$

If all of the rays $On$ and $nO'$ are coordinated with each other passage through the condenser lens system in accordance with the Abbe sine condition, their relation may be expressed by the formula:

$$\sin a_n = M \sin a'_n, \quad n = 1, 2, 3, \ldots N \quad (2)$$

in which M is the magnification between the source O and its image O'.

It will now be shown that when the rays are coordinated in accordance with the Abbe sine condition, the illumination of the aperture 12 will decrease toward the outer edges of the aperture when the source O emits in accordance with Lambert's cosine law of emission. If one considers an infinitesimally narrow cone $uOv$ about the $n$th ray in the object space and the related $n$th cone $u'O'v'$ in the image space of the condenser lens system, one finds that when the source emits in accordance with Lambert's law $$J(r_n) = \frac{d(\sin^2 \alpha_n)}{M^2 d(\tan^2 \alpha'_n)}, \quad n = 1, 2, 3, \ldots N \quad (3)$$

in which $J(r_n)$ is the ratio of the illumination of the minute area of the aperture 12 which is intercepted by the infinitesimal cone $u'O'v'$ to the illumination of the aperture 12 adjacent the point of intersection of the aperture and the optical axis OO'. As given by Eq. 3 $J(r_n)$, the relative illumination, is a point function of $r_n$, the distance from the optical axis to the point of intersection of the $n$th ray with the aperture 12. The right hand member of Eq. 3 denotes in the language of the differential calculus the derivative of $\sin^2 \alpha_n$ with respect to $\tan^2 \alpha'_n$. The derivative is to be evaluated at the particular value of $\alpha = \alpha_n$ and is to be divided by $M^2$. Eq. 3 holds whether or not $\alpha_n$ and $\alpha'_n$ are related in accordance with the Abbe sine condition of Eq. 2.

If it is assumed that the Abbe sine condition is satisfied in the condenser lens system, the evaluation of the derivative of Eq. 3 in view of Eq. 2 gives the simple result $$J(r_n) = \cos^4 \alpha_n', \quad n = 1, 2, 3, \ldots N \quad (4)$$

The physical interpretation of Eq. 4 is that if we are given a source O which radiates in accordance with Lambert's law and use therewith a condenser lens system which is substantially corrected for both spherical aberration and the Abbe sine condition, the relative illumination at the aperture 12 will diminish outwardly as $\cos^4 \alpha_n'$. If, for example, $\alpha'_N = 15°$, $\cos^4 \alpha'_N = 0.87$ so that the illumination ratio between the edge of the aperture 12 and its center will be 0.87. But the condenser system actually transmits the entrance cones with light losses, and accordingly the relative illumination ratio will be less than 0.87. Furthermore, if the objective vignettes, the relative edge to center screen illumination will be reduced still further below 0.87. If the size of the aperture 12 requires that $\alpha'_N$ be even greater than 15°, $\cos^4 \alpha'_N$ decreases even more rapidly.

Suppose that the entrance cones of Fig. 2 have been drawn to contain equal light flux so that $\phi_n = \phi$, a constant. Since the illumination of the aperture 12 is given by Eq. 1, the above considerations show that when $\alpha_n$ and $\alpha'_n$ are coordinated in accordance with the Abbe sine condition, the areas $\sigma_n$ must increase as $$\frac{1}{\cos^4 \alpha_n'}$$

when the number of zones is large. In other words, the areas of the outer zones are too large for the purpose of securing uniform illumination over the aperture 12. However, if the illumination is to be controlled so as to obtain greater uniformity, this means that the areas of the outer zones, namely $\sigma_n$ as $n$ approaches N, must be reduced or "pinched down" relative to the areas of the inner or more central zones of the aperture 12. This reduction in the size of the outer zones can be brought about by choosing the interior surfaces of the two condenser elements of Fig. 2 so that the Abbe sine condition is violated. Nevertheless, the coordination which must hold between $\alpha_n$ and $\alpha'_n$ for securing uniform illumination at the aperture 12, when the source O emits in accordance with Lambert's law and when light losses of the condenser system are neglected, can be obtained directly from Eq. 3 from the following considerations. If the illumination of the aperture is to be uniform, the relative illumination $J(r_n) = 1$. But if $J(r_n) = 1$ in Eq. 3, this can only mean that $$\sin \alpha_n = M \tan \alpha'_n \quad (5)$$

Thus, instead of being coordinated in accordance with the Abbe sine condition of Eq. 2, the rays in the object and image spaces of the condenser system must be drawn so as to violate the Abbe sine condition in accordance with Eq. 5. Suppose again that the entrance cones have been drawn to contain equal light flux $\phi_n = \phi$, $n = 1, 2, 3, \ldots M$. The angles $\alpha_n$, $n = 1, 2, 3, \ldots N$ are then known. Uniform illumination of the aperture 12 will now be obtained according to Eq. 1 by laying out the rays $nO'$, $n = 1, 2, 3, \ldots N$, in the image space of the condenser such that the annular areas $\sigma_n$ are equal. Since Eq. 5 is the condition for uniform illumination when the source emits according to Lambert's law and when the losses of light in the condenser are negligible, it follows that if $\alpha'_n$ are computed and laid out from the known values of $\alpha_n$ in accordance with Eq. 5, the areas $\sigma_n$ will automatically be equal.

A graphical method for obtaining controlled illumination over the aperture 12 or over its screen image will now be illustrated. The problem consists of two well defined parts: First, it is necessary to lay out a coordination between the rays in the object and image spaces of the condenser system, which coordination will substantially produce the desired control over the said illumination; and, secondly, it is necessary to determine the aspheric condenser surfaces which will produce the above coordination among the rays in the object and image spaces of the condenser system. The distance from the center of the aperture 12 to the point in the aperture at which the relative illumination is to be computed will be denoted as $r$. The desired or specified relative illumination at the point $r$ will be denoted by $S(r)$. If the condenser has no light losses, $S(r) = J(r)$ where $J(r)$ is the relative illumination function which enters explicitly into the coordination of the rays, as for example $J(r_n)$ of Eq. 3. Suppose that the condenser does not transmit the entrance cones equally. Tentative interior surfaces between the first and last surfaces F and L, Fig. 2, are then assumed, computed or estimated and the reflection and absorption losses along the rays in the entrance cones are calculated. Let the transmission of the $n$th entrance cone be denoted by $T_c(r = r_n)$. If the number N of the entrance is large, it follows directly that $$S(r) = T_c(r) J(r) \quad (6)$$

Because the relative illumination $S(r)$ of the aperture is specified and is the controlled illumination and because $T_c(r)$ is known, the relative illumination function $J(r)$ is determined by Eq.

6. The situation is more complicated when the objective vignettes or does not transmit the cones of light from points $r$ in the aperture equally and when it is desired to choose $J(r)$ so as to control the screen illumination. From a knowledge of the properties of the objective the light transmission $T_0(r)$ of the objective for the bundle of rays from points $r$ in the aperture is estimated. Let $S_s(M_0 r)$ be the specified relative screen illumination where $M_0$ is the magnification of the objective. Then $$S_s(M_0 r) = T_0(r) S(r) = T_0(r) T_c(r) J(r) \quad (7)$$

Thus $$J(r) = S(r)/T_c(r) \quad (8a)$$

when the primary emphasis is upon controlling the relative illumination $S(r)$ of the aperture and $$J(r) = S_s(M_0 r)/T_c(r) T_0(r) \quad (8b)$$

when the emphasis is placed upon controlling the relative screen illumination $S_s(M_0 r)$. Eqs. 8a and 8b mean physically that when $J(r)$ is determined from them the relative illumination of the aperture 12 or of its screen image will have the specified relative illumination $S(r)$ or $S_s(M_0 r)$ according as $J(r)$ is computed from Eq. 8a or Eq. 8b. These distinctions between the relative illumination function $J(r)$ and the specified relative illuminations $S(r)$ or $S_s(M_0 r)$ must be made whenever there exist appreciable losses of light from transmission through the condenser or because of the objective or both. Since $T_0(r)<1$ and $T_c(r)<1$ in all practical cases, it follows that $J(r)>S(r)>S_s(M_0 r)$ which means that the relative illumination function as provided by the coordination of the rays in the object and image spaces of the condenser must be greater than the specified illumination of the aperture 12 or its screen image whenever the condenser and the objective do not transmit all cones of light substantially equally. If therefore the relative illumination function $J(r)$ is determined from Eq. 8, the invention permits controlled illumination over the aperture 12 even when the condenser transmits the entrance cones unequally and when the objective vignettes.

The manner in which the rays in the object and image spaces of the condenser may be constructed so as to have the proper coordination for securing the specified controlled illumination $S(r)$ over the aperture 12 or the controlled illumination $S_s(M_0 r)$ over its screen image will now be described. The required relative illumination function $J(r)$ is computed from Eq. 8 or by any other appropriate method and may be plotted as the curve C of Fig. 11. $J(r)$ assumes the particular values $J(r_n)$ at the points $r=r_n$, $n=1, 2, 3, \ldots N$, where $r_n$ corresponds to the point of intersection of the $n$th ray in Fig. 2 with the plane of aperture 12. In order to obtain controlled illumination over the aperture 12 the rays of Fig. 2 must be coordinated differently in a manner illustrated by Fig. 3. It will be supposed that the entrance cones shall be laid out to contain equal amounts of light flux from the small source O whose flux or intensity distribution is known. Before the N entrance cones are drawn, it is necessary to ascertain the size of at least one of these cones, for example of the first entrance cone $bOa$ in Fig. 3. The size of the first entrance cone is most conveniently determined after the areas $\sigma_n$, $n=1, 2, 3, \ldots N$, Fig. 3, have been chosen by properly choosing $r_n$, $n=1, 2, 3, \ldots N$. It has been seen that the illumination at the aperture 12 may be controlled by the choice of area $\sigma_n$ corresponding to the $n$th entrance cone, $n=1, 2, 3, \ldots N$. If the entrance cones have equal flux, it follows from Eq. 1 that $$\frac{E_n}{E_1} = \frac{\sigma_1}{\sigma_n}, \quad n=1, 2, 3, \ldots N \quad (9)$$

But $E_n/E_1$ is the relative illumination function $J(r_n)$ when the number N of zones is chosen large. Hence one must choose $\sigma_n$ such that $$\frac{\sigma_1}{\sigma_n} = J(r_n) \quad (10)$$

with $J(r_n)$ determined from Eq. 8 at the points $r=r_n$.

Figure 11:
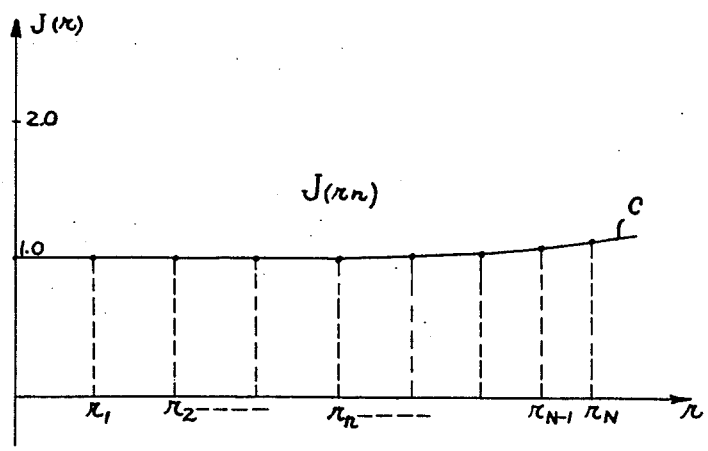
Fig. 11 is a graph for showing relative intensities which may be produced at a film gate by a condenser lens system embodying the invention.

The choice of $\sigma_n$ in accordance with Eq. 10 gives a controlled illumination at the aperture 12 which approaches the specified relative illumination $S(r)$ more and more closely as the number N of the zones is increased. The number $N=8$ in Fig. 3. This number is chosen merely for convenience of illustration. In a practical case N should be at least 25. The following principles apply no matter how large N is chosen. From Eq. 10

$$\frac{\sigma_1}{\sigma_n} = \frac{r^2_1}{r^2_n - r^2_{n-1}} = J(r_n), \quad n=2, 3, 4, \ldots N \quad (11)$$

in which $J(r_n)$ are values which may be selected from the curve C, Fig. 11. Now $r_N$ is known from the maximum radius of the aperture 12. Hence Eq. 11 forms $N-1$ simultaneous equations for determining the $N-1$ unknown radii $r_1, r_2, r_3, \ldots N-1$. To solve these equations in a straightforward manner is so tedious that the following method of solution is preferred. Beginning at $n=N$ where $$\frac{r^2_1}{r^2_N - r^2_{N-1}} = J(r_n)$$

one makes a good guess as to the value of $r_{N-1}$. With this guessed value of $r_{N-1}$, $r_1$ is then computed. From the equation for $n=_{N-1}$, $$\frac{r^2_1}{r^2_{N-1} - r^2_{N-2}} = J(r_{N-1})$$

Hence $r_{N-2}$ can be computed corresponding to the original guess for $r_{N-1}$. In this manner all values $r_1, r_2, r_3, \ldots (N-2)$ are determined from Eq. 11 corresponding to the guessed value of $r_{N-1}$. Note that $r_{m-1}$ is determined from the equation with $n$ set equal to $m$ in Eq. 11. Hence from the equation with $n=2$, $$\frac{r^2_1}{r^2_2 - r^2_1} - J(r_2) = H(r_{N-1})$$

in which H is a function of the original guess for $r_{N-1}$ and in which $H(r_{N-1})=0$ when $r_{N-1}$ is guessed correctly.

In practice, the correct guess will not be made but several guesses for $r_{N-1}$ can be made such that a plot of $H(r_{N-1})$ against the guessed values of $r_{N-1}$ passes through zero. The value of $r_{N-1}$ for which $H(r_{N-1})=0$ is thus picked from the plotted curve. The correct values of $r_1, r_2, r_3, \ldots (N-2)$ are now computed from the plotted value $r_{N-1}$ for which $H(r_{N-1})=0$ by repeating the above calculations with Eq. 11. In this manner the radii $r_n$, $n=1, 2, 3, \ldots N$, of the N zones of the aperture 12 become known corresponding to a specified illumination function $S(r)$ and a relative illumination function $J(r)$ computed from $S(r)$ in accordance with Eq. 8. It is emphasized that when the entrance cones have been drawn to contain equal light flux and the areas $\sigma_n$ have been determined from the above procedure, the illumination ratio at the aperture 12 is determined irrespective of how the rays are drawn from the points $r_n$ and toward the neighborhood of $O'$.

If it is desired to employ the condenser for the purpose solely of illuminating the aperture 12, appreciable amounts of spherical aberration of the condenser might be allowed in which case the rays in the image space do not necessarily have to be drawn so that all of them pass through the axial point $O'$. This means that the specified relative illumination $S(r)$ will be obtained at the aperture 12 even when the condenser is designed to have spherical aberration provided that the radii $r_n$, $n=1, 2, 3, \ldots N$, have been determined in the above described manner from Eq. 11. However, when the image of the aperture 12 is to be projected by means of a projection objective upon a screen, the rays leaving the aperture 12 from all points $r$ in the aperture should be directed so as to pass into and through the projection objective. For this purpose the rays from $r_n$ are preferably drawn toward $O'$ with substantially no spherical aberration as in Fig. 3. For definiteness in discussing a projection problem of controlled screen illumination, let the rays $n=1, 2, 3, \ldots N$ in the image space of the condenser, Fig. 3, be drawn from the known points $r_n$ to the axial point on the image $O'$. The N rays in the image space have thus been determined and laid out graphically. Returning to the problem of laying out the N rays in the object space of the condenser, the size of the first entrance cone $bOa$ can now be determined from the known angle $\alpha'_1$ and the magnification M of the condenser. The magnification M is usually, but not necessarily, chosen such that the image $O'$ of the small source O fills the clear aperture of the projection objective. For definiteness let M be chosen so that the clear aperture of the objective is filled with light from the source O. If the number N of the zones or rays is large, the angles $\alpha_1$ and $\alpha'_1$ belong to the paraxial bundle of rays passing through the condenser. Irrespective of the specified relative illumination function $S(r)$, the paraxial rays of the condenser continue to obey with excellent approximation the well known paraxial law $$\alpha_1 = M\alpha_1' \quad (12)$$

Figure 3:
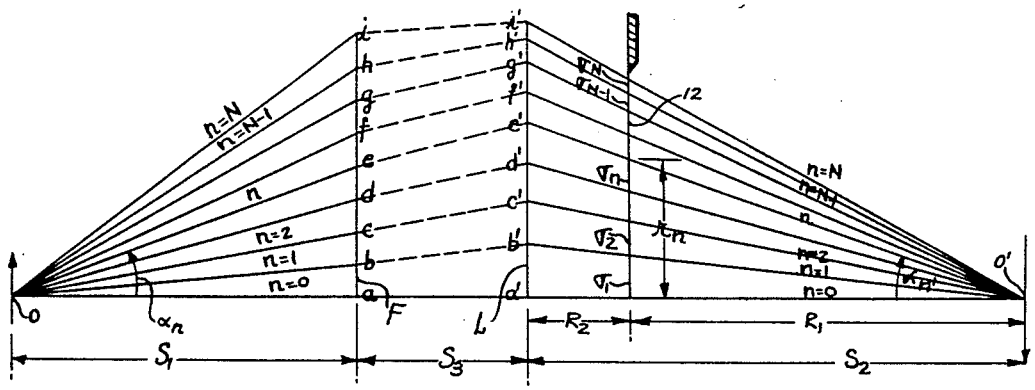

Hence the size of the first entrance cone, the angle $\alpha_1$, is determined from Eq. 12 from the chosen value of the magnification M of the condenser and the angle $$\alpha'_1 = \frac{r_1}{R_1}$$

where $r_1$ is the radius of the first zone in the aperture 12 as determined from Eq. 11 and where $R_1$ is the known distance indicated in Fig. 3. The light flux $\phi$ in the first entrance cone is now determined from the known intensity distribution from the small source O. From this intensity distribution the second, third, etc., entrance cones are determined and drawn successively from $n=1$ to $n=N$. The coordination of the N rays in the object and image spaces of the condenser for obtaining the specified relative illumination $S(r)$ over the aperture 12 and the relative illumination $S_s(M_or) = T_o(r)S(r)$ of the screen may be thus completely determined graphically.

The next aspect of the invention deals with the method of constructing the aspheric surfaces of the condenser so that the condenser focuses the rays from the small light source O into its image $O'$ in such a manner as to realize the prescribed coordination between the rays in the object and image spaces of the condenser for the purpose of securing the specified relative illumination $S(r)$ at the aperture 12. We will now describe how the two aspheric condenser surfaces can be determined graphically for the special case in which the first surface F and the last surface L of the condenser are chosen as plano and in which the coordination between the rays in the object and image spaces of the condenser is the particular coordination of Fig. 12. The condenser lens construction of Fig. 12 has been determined graphically from the example in which magnification $M=2$, in which the light source O emits in accordance with Lambert's law, in which $T_c(r) = 1$ (meaning that the condenser transmits the entrance cones substantially equally) and in which $S(r) = 1$ (meaning that the illumination across the aperture 12 shall be substantially uniform). The refractive index of the condenser is chosen as 1.52. (Although a special case is here given as an example, it will be appreciated that the method for determining the aspheric surfaces is not limited to this example but applies equally well to a variety of possible examples.) It will be noted that in Fig. 12 the cones converging upon $O'$ have been spaced equally and that the entrance cones increase in size and hence in flux content as $n$ approaches N. That is, the entrance cones have not been drawn so as to contain equal amounts of light flux. Instead, the coordination between the rays leaving O and converging upon $O'$ has been determined from a different but equivalent method to that described in the above paragraph and based on Eq. 11. This procedure has been chosen in order to emphasize that the problem of constructing the aspheric condenser surfaces is essentially the same for all equivalent coordinations no matter whether such coordinations are obtained with the aid of Eq. 8 and entrance cones of equal flux or have been obtained by any other appropriate means.

Figure 12:
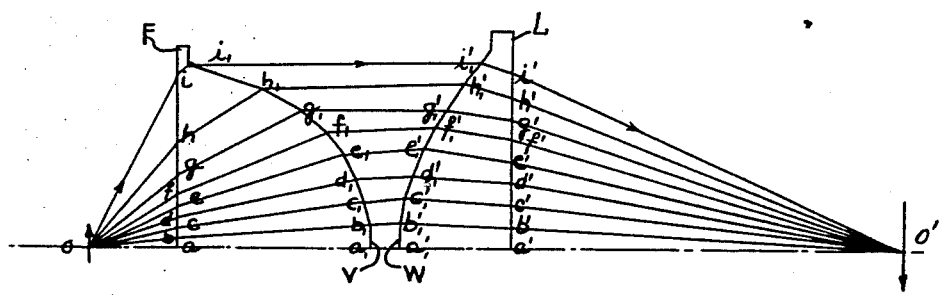
Fig. 12 is an additional sketch which may be useful for obtaining an understanding of the invention.

Rays $Ob, Oc, Od, \ldots Oi$ of Fig. 12 are extended with the aid of Snell's law beyond the first surface F. Similarly, rays $b'O', c'O', d'O', \ldots i'O'$ are extended backwards from the last surface L. A point $b_1$ on the extension of the first ray $Ob$ is chosen as the starting point of the aspheric surface V and a corresponding point $b'_1$ on the backward extension of the ray $b'O'$ is chosen as the starting point of the second aspheric surface W. The choice of starting points $b_1$ and $b'_1$ is to some extent a matter of trial and error but once a definite selection has been made, the surfaces V and W are automatically determined. The shape of the resulting surfaces depends upon the choice of starting points. Hence by investigating the choice of starting points, aspheric surfaces of the most suitable shape for manufacturing or other purposes can be discovered. Suppose for definiteness that the starting points $b_1$ and $b'_1$ have been selected as in Fig. 12. Points $b_1$ and $b'_1$ are connected by the line element $b_1 b'_1$ to complete the first ray from O to O'. Since the positions of $b_1$ and $b'_1$ are known, the orientation of $b_1 b'_1$ is completely determined. With the aid of Snell's law the required slope or tangent of the surface V at the point $b_1$ is determined and this tangent is drawn through $b_1$ and upward until it intersects the extension of the second ray $Oc$ at the point $c_1$. Similarly, the tangent to the surface W is computed and drawn through the point $b'_1$ until it intersects the backward extension of the second ray $c'O'$ at the point $c'_1$. The points $c_1$ and $C'_1$ which lie in the surfaces V and W, respectively, are thus determined and connected by the line element $c_1c'_1$ to complete the second ray from O to O'. The above procedure of computing and drawing the tangents to the surfaces V and W is now repeated step by step until the upper extremity of the aspheric surfaces has been reached. The tangents through $i_1$ and $i'_1$ may be extended to permit additional heights of the surfaces V and W for the purpose of obtaining a definite tolerance for lateral displacement of the condenser in the assembly of the condenser unit.

If the number N of rays in the procedure just described is large, the tangents describe the aspheric surfaces V and W with high accuracy, in fact the surfaces V and W are the envelopes of the tangents. The complete aspheric surfaces V and W are formed by rotating the curves V and W about the optical axis OO'. It will be seen from Fig. 12 that fairly smooth curves V and W are obtained when N is only 8. The smoothness is greatly improved by choosing N as 25 or higher. The accuracy of the aspheric surfaces is likewise improved. Furthermore, as N is increased the starting points $b_1$ and $b'_1$ approach the optical axis to determine the paraxial radii of these surfaces without computing these radii from the paraxial data. When desired, the results of the graphical method may be smoothened or improved by fitting curves to the two sets of computed points $a_1, b_1, c_1 \ldots i_1$ and $a'_1, b'_1, c'_1, \ldots i'_1$.

It is noted that in order to refract the rays from the source O into the corresponding rays converging upon O' the surfaces V and W must be aspheric. Although the first and last surfaces F and L have been illustrated as plano in Fig. 12, the same principles and graphical method may be used to determine that required aspheric surfaces V and W when F and L are predetermined spherical surfaces or even definitely assigned aspherical surfaces. Again, the same principles and graphical method apply when condenser elements with assigned thickness and spherical or aspherical surfaces are placed either between the source O and the first surface F or between the last surface L and the projection aperture 12. The graphical procedure remains the same even when the two condenser elements of Fig. 12 are replaced by a single element whose aspheric surfaces are to be determined as the first and last surface. The graphical procedure is in fact simplified in this case because the points $b_1, c_1, \ldots i_1$ and $b'_1, c'_1, \ldots i'_1$ occupy the positions of $b, c, d, \ldots i$ and $b', c', d', \ldots i'$ respectively, so that the extension of the rays forward through the first surface and backward through the last surface can be avoided.

If desired, the single element can be replaced by two elements of like refractive index and whose interior surfaces are in contact or are substantially in contact. Placing a condenser element with assigned thickness, surfaces and refractive index between the two aspheric elements of Fig. 12 is a possible variation but this variation is unrecommended on account of the additional difficulties which this variation imposes upon the graphical method. As a generalization, it is observed that the aspheric surfaces V and W are preferably adjacent in the sense that no spherical surfaces should be disposed between them, but this generalization is one which is recommended simply for the purpose of simplifying the analytical problem of computing the aspheric surfaces which are necessary for obtaining the prescribed coordination between the rays in the object and image spaces of the condenser. If thin, plano elements of, for example, heat absorbing glass such as at 22 in Fig. 1 are placed between the computed surfaces V and W, their effect upon the said coordination of the rays is negligible. When the use of such heat absorbing glass elements placed between the aspheric surfaces V and W is intended, the aspheric surfaces V and W are preferably constructed so that the rays $b_1b'_1, c_1c'_1, \ldots i_1i'_1$, Fig. 12, are substantially parallel to the optical axis. This parallelism can frequently be obtained by the proper choice of starting points $b_1$ and $b'_1$.

It has been stated that the shape at the aspheric surfaces V and W, Fig. 12, depends upon the starting points $b_1$ and $b'_1$. For a given coordination between the rays in the object and image spaces of the condenser the shape of the aspheric surfaces depends also upon the chosen radii of the first and last surfaces F and L, upon the refractive index of the two associated condenser elements and upon the selected positions of the first and last surfaces. By repeating the above described graphical method for various choices of these parameters, aspheric surfaces of the most advantageous shape for manufacturing may be determined.

A graphical method for determining both the coordination between the rays in the object and image spaces of the condenser in order to obtain a prescribed control over the illumination of the projection aperture and the aspheric surfaces necessary for realizing the prescribed coordination has been described. Whereas the graphical method emphasizes the essential physical principles which underlie the invention, analytical methods are often preferable in that they may be more convenient to execute or give rise to a more satisfactory formulation for obtaining a desired accuracy. The following analytical method for determining the coordination among the rays has the advantages of generality, convenience and increased accuracy. Let the intensity of the small, axially symmetrical source of light be denoted by $\mathscr{I}(\alpha)$ in which $\alpha$ is the angle which the emitted rays make with respect to the normal to the light source with the normal coinciding with the optical axis and passing through the center of the source O as in Fig. 3. The actual intensity along the optical axis is $\mathscr{I}(o)$. In controlling the illumination over the aperture 12, it is the relative intensity $I(\alpha)$ which matters where $I(\alpha)$ is defined by $$I(\alpha) = \frac{\mathscr{I}(\alpha)}{\mathscr{I}(o)} \qquad (13)$$

The relative illumination function $J(r)$ which will provide the specified relative illumination $S(r)$ over the aperture 12 has already been defined by Eq. 8. The most general relation which must hold between the rays $\alpha$ and $\alpha'$ in order that the condenser shall give the relative illumination function $J(r)$ when the relative intensity of the small source of light is $I(\alpha)$ can be shown to be the equation $$J(r) = \frac{2I(\alpha)}{M^2} \frac{\sin \alpha \, d\alpha}{d\left(\left(1 - \frac{\Delta a'}{R_1}\right) \tan \alpha'\right)^2} \qquad (14)$$

in which $R_1$ is the aperture-to-image distance defined in Fig. 3, $\Delta a'$ is the usual longitudinal spherical aberration and in which the letter $d$ denotes the differential of the quantity which it precedes. If $J(r)$ and $I(\alpha)$ are given by the assigned data, Eq. 14 can be solved by methods of calculus to find the corresponding relation which must hold between the corresponding rays $\alpha$ and $\alpha'$ in the object and image spaces of the condenser with assigned paraxial magnification M. As was seen from a consideration of the graphical method, control of the illumination at the aperture 12 can be obtained even when spherical aberration is present. Determinating the relation between $\alpha$ and $\alpha'$ when $J(r)$, $I(\alpha)$, M, $R_1$ and $\Delta\alpha'$ have been assigned is the analytical equivalent of the above described graphical method for finding the coordination between the rays in the object and image spaces of the condenser. When the aperture 12 is to be projected to form a screen image, it is preferable to design the condenser so that the spherical aberration is substantially zero, that is so that $$\Delta\alpha'=0 \qquad (15)$$

The integration of Equation 14 simplifies in view of Eq. 15 to $$\int_0^{(M\tan\alpha')^2} J(r)d(M\tan\alpha')^2 = 2\int_0^\alpha I(\alpha)\sin\alpha\, d\alpha \qquad (16)$$

If $J(r)$ is determined from the specified relative illumination $S(r)$ with the aid of Eq. 8, Eq. 16 determines the coordination between $\alpha$ and $\alpha'$ when the relative intensity $I(\alpha)$ of the source is known and when the condenser system shall be constructed to have substantially no spherical aberration for a given wave length of the incident or emitted light.

As an important sub-class of Eq. 16, suppose that the source of light obeys Lambert's law, i. e. suppose that $$I(\alpha)=\cos(\alpha) \qquad (17)$$

Then from Eqs. 16 and 17

$$\int_0^{(M\tan\alpha')^2} J(r)d(M\tan\alpha')^2 = \sin^2\alpha \qquad (18)$$

Eq. 18 is of great importance in practical condenser design because many small light sources either obey or show approximate obedience to Lambert's law. When $\alpha'$ is assigned a particular value, the left hand member of Eq. 18 can be solved to obtain a corresponding number. The only plausible relative illumination functions $J(r)$ are those for which this number is never greater than unity. A particular value of $\alpha$ corresponds to the said number and hence to $\alpha'$. If this calculation is repeated for various values of $\alpha'$, a table of $\alpha$ versus $\alpha'$ and hence the coordination in the ray system of the object and image spaces of the condenser becomes known. Of course, the only significant values of $\alpha'$ which enter into the upper limit of the integral are equal to or less than $\alpha'_N$, the angle of the steepest ray through the aperture 12.

As an important practical sub-class of Eq. 18 is that in which $$J(r)=1 \qquad (19)$$

that is the class in which the relative illumination function $J(r)$ is substantially equal to unity, the source of light substantially obeys Lambert's law and the spherical aberration of the condenser shall be negligible. From Eqs. 18 and 19, we find for this case the simple coordination $$\sin\alpha=M\tan\alpha' \qquad (20)$$

between the rays in the object and image space of the condenser.

As another practical sub-class of Eq. 18 is that in which $$J(r)=\frac{1}{\cos^2\alpha'}, \text{ with } r=R_1\tan\alpha' \qquad (21)$$

From Eqs. 18 and 21 we have $$\sin\alpha=M\tan\alpha'\left(1+\frac{M^2}{2}\tan^2\alpha'\right)^{\frac{1}{2}} \qquad (22)$$

The practical importance of this sub-class rests in the fact that when $J(r)$ is chosen in accordance wiht Eq. 21 the relative illumination function will compensate for the vignetting losses in a large class of projection objectives.

The use and selection of Equations 14 to 22 will be described briefly. In most, but not necessarily all, condenser problems the designer will prefer to avoid or to minimize spherical aberration. The most general equation which need be considered is then Eq. 16. A study of the intended source of illumination may reveal that the source obeys Lambert's law so closely that the deviation from Lambert's law is negligible. On the other hand, the designer may wish to neglect a substantial deviation from Lambert's law in order to gain simplicity in his design problem while obtaining greater uniformity of illumination than is possible by adhering to the coordination provided by the Abbe sine condition. Eq. 18 then becomes the equation of the most general interest. Or if the designer finds that the selected objective does not vignette appreciably, he may select the coordination of Eq. 20. If he wishes to compensate for vignetting losses in the objective, he may select the coordination of Eq. 22 or he may introduce into Eq. 18 a relative illumination function $J(r)$ which he has decided to be more suitable for his purpose as a result of having considered Eq. (8) or as a result of any other suitable consideration. It is seen therefore that the coordinations which are available by the analytical method of Eqs. 14 to 22 will fit a variety of situations which arise in practice and that the method enables the designer to exercise considerable flexibility of judgment in arriving at a coordination which will provide an acceptable degree of control over the illumination at the projection aperture or over the illumination at the screen.

As the first example of analytically finding the required coordination between the rays in the object and image spaces of the condenser, we consider the case in which the light source O emits substantially in accordance with Lambert's law, in which the losses of light by reflection and absorption in the condenser are negligible and in which it is desired to illuminate the aperture 12 uniformly or substantially uniformly. In this case, $I(\alpha)=\cos\alpha$. Since $T_c(r)=1$, $S(r)=1=J(r)$ from Eq. 6. The case $I(\alpha)=\cos\alpha$ and $J(r)=1$ is governed by Eq. 20 when the condenser is to be designed for negligible spherical aberration. The coordination between the rays is accordingly given by $\sin\alpha=M\tan\alpha'$. It is pointed out that if in addition the objective transmits all of the rays equally, also the screen illumination will be uniform or substantially uniform.

As a second example of the use of the analytic method for finding the required coordination between the rays in the object and image spaces of the condenser, we consider the case in which the source obeys Lambert's law, in which the transmission factor of the combined condenser and objective is well approximately by taking $T_c(r)T_o(r)=\cos^2\alpha'$ and in which it is desired to obtain substantially uniform screen illumination. Since Lambert's law is obeyed, $I(\alpha) = \cos \alpha$. Since substantially uniform screen illumination is specified, $$J(r) = \frac{1}{\cos^2 \alpha'}$$

from Eq. 8. The case in which the condenser shall be corrected for spherical aberration, in which $I(\alpha) = \cos \alpha$ and in which $$J(r) = \frac{1}{\cos^2 \alpha'}$$

is governed by Eq. 22. Hence the required coordination between the rays in the object and image spaces of the condenser is given by Eq. 22:

$$\sin \alpha = M \tan \alpha' \left(1 + \frac{M^2}{2} \tan^2 \alpha'\right)^{\frac{1}{2}}$$

As a third example of the use of the analytic method for finding the required coordination between the rays in the object and image space of the condenser, we consider the case in which the source emits as a point so that $I(\alpha) = 1$, in which the light losses in the condenser and objective are negligible and in which it is desired to obtain uniform screen illumination. Since $T_c(r) T_o(r) = 1$, $J(r) = 1$. Assuming that the condenser shall be designed to have substantially no spherical aberration, the ray coordination will be obtained by setting $J(r) = 1$ and $I(\alpha) = 1$ in Eq. 16. The result is the required ray coordination given by $$2 \sin \left(\frac{\alpha}{2}\right) = M \tan \alpha' \qquad (23)$$

between the rays in the object and image spaces of the condenser.

As a fourth example of the required coordination between the rays in the object and image spaces of the condenser, suppose that the light source departs from the cosine law and emits in accordance with the following law which expresses a first approximation thereof: $I(\alpha) = (1-Q) \cos \alpha + Q \cos^2 \alpha$ in which Q is a constant depending upon the particular source. We will assume that $Q = \frac{1}{2}$, that the light losses in the objective and condenser are considered to be negligible and that substantially uniform screen illumination is required. Thus $J(r) = 1$ as in the previous example. If the condenser is desired to have substantially no spherical aberration, the coordination between the rays is obtained by substituting the above value of $I(\alpha)$ and $J(r) = 1$ into Eq. 16. The result is $$M \tan \alpha' = \left[(1-Q) \sin^2 \alpha + \frac{2Q}{3}(1-\cos^3 \alpha)\right]^{\frac{1}{2}}; Q = \frac{1}{2} \qquad (24)$$

as the required coordination between the rays in the object and image spaces of the condenser. Of course Q may have values differing from $\frac{1}{2}$ for other sources of light. This example is important because it indicates how a wide variety of sources may be treated analytically as regards the departure of the emission of the source from Lambert's law. We observe that if the emission of the source is written as the series $$I(\alpha) = \sum_{n=1}^{n=n} A_n \cos^n \alpha \qquad (25)$$

with $$1 = \sum_{n=1}^{n=n} A_n \qquad (26)$$

this value of $I(\alpha)$ allows the right hand integrand of Eq. 16 to be integrated term by term. The integer $m$ is taken large enough so that the series of Eq. 25 represents the emission law of the source to the desired accuracy. In principle, therefore, the right hand member of Eq. 16 can be evaluated for any small, axially symmetrical source by choosing the integer $m$ sufficiently large. For Lambert's law, $m=1$ and $A_1=1$. The second approximation is that given in this example, namely $m=2$, $A_1 = (1-Q)$ and $A_2 = Q$. Since $J(r)$ is an even function of $\tan \alpha'$ with $r = R_1 \tan \alpha'$, the left hand member of Eq. 16 can be solved in a manner which is similar in principle to that just stated for the right hand member of Eq. 16. One may introduce $$x = (M \tan \alpha')^2 \qquad (27)$$

and express $J(r)$ as the series $$J(r) = \sum_{j=0}^{j=1} B_j x^j \qquad (28)$$

in which $$B_0 = 1 \qquad (29)$$

The coefficients $B_j$, $j=0, 1, 2, \ldots 1$, are evaluated so that Eq. 28 gives $J(r)$, the relative illumination function, with the desired accuracy. When $J(r)$ of Eq. 28 is substituted into the left hand integral of Eq. 16, also this integral can be integrated term by term. Eq. 16 now gives an explicit relation between $\alpha$ and $\alpha'$ in terms of a method of series. It will be seen therefore that the analytical method permits the coordination between the rays in the object and image spaces of the condenser to be computed for a range of light sources with differing laws of emission and for an extended range of specified relative illuminations over the projection aperture.

It has been shown how the required coordination of the rays in the object and image spaces of the condenser can be found graphically or analytically. The analytic method is the preferable method. It has also been shown how the aspheric surfaces of the condenser may be constructed graphically from a prescribed coordination of the rays to secure a condenser which provides the desired control over the relative illumination of the projection aperture or of the screen image of said aperture. A preferred and analytic method will be briefly described presently for computing and constructing the aspheric surfaces of said condenser.

It may be noted that although the filaments of the usual projection lamps are small, these filaments are commonly of square, rectangular or similar shapes. In general, these filaments do not have axial symmetry. The method of this invention is nevertheless applicable to a variety of filament shapes but will give the greatest degree of control over the illumination in the case of those lamp filaments which have near-axial symmetry. Square projection filaments are common and possess intensity distributions having a high degree of axial symmetry. When the source does not have complete axial symmetry, the relative illumination function $I(\alpha)$ is preferably chosen so as to include only the axially symmetrical portion of the light flux radiated into the condenser. The remaining portion of the flux radiated into the condenser is ignored in designing the condenser system. If the lamp filament is small and approximately square, the ignored portion of the light flux may in fact be negligible. But whether the ignored flux is negligible or not, in practice with actual commercial projection filaments the method of this invention as applied to the axially symmetrical portion of the useful light flux radiated by the source will provide a condenser having a marked degree of control over the illumination of the projection aperture or its screen image.

Figure 9:
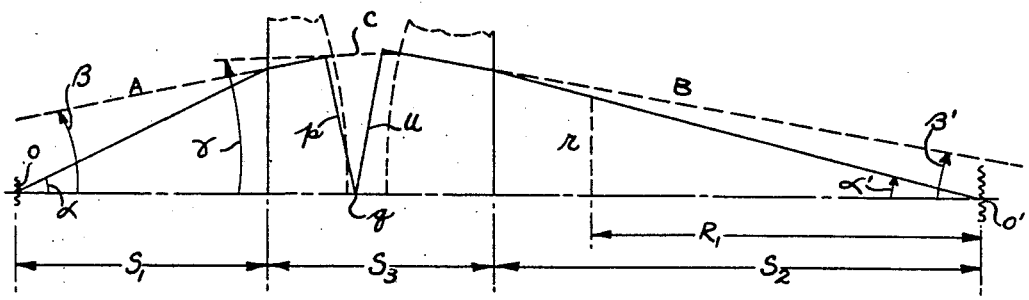
Fig. 9 is another sketch which may be useful in obtaining an understanding of the invention.

In place of the above described methods for determining the aspheric curvatures required, the following more exact and convenient analytical method might be employed. For this purpose we refer to Fig. 9 in which two aspheric surfaces of a condenser lens system comprising any convenient number of lens elements are to be figured. For ease in describing this method a two element system having two plano outside surfaces will be used, but it should be clearly understood that the invention is not so limited. As stated previously the desired relative illumination function $J(\alpha)$ for all points on the slide from center to edge thereof is first determined. A relative intensity function $I(\alpha)$ is also chosen for the light source and we may then set up the relation or coordination between the angle $\alpha$ of any ray in the object space and the angle $\alpha'$ of the same ray in the image space which is necessary to give the desired relative illumination on the slide when no spherical aberration exists. This can be accomplished by use of Eq. 16. We must now analytically characterize the rays from the axial points O and O', respectively, as to their positions in the medium or lens elements immediately preceding the first aspheric surface and immediately following the second aspheric surface. The line A indicates the direction of such a ray from the point O after it has passed through all refractive surfaces preceding the first aspheric surface. Its position, accordingly, can be defined by sin $\beta$ and the length of the line $p$ drawn perpendicularly to ray A from an arbitrary point $q$, where $\beta$ is the angle the extension of this ray meeting the first aspheric surface would make with the optical axis. Likewise, B represents an extension of the same ray in the medium or lens element immediately following the second aspheric surface and its angular relation to the optical axis is indicated by $\beta'$. Its position may be defined by sin $\beta'$ and $u$, wherein $u$ is the length of a line extending from point $q$ and meeting the line B perpendicularly.

These quantities sin $\beta$, sin $\beta'$, $p$ and $u$ may be considered as functions of a parameter $w$ which is any quantity which will determine the individual rays of the two bundles $\alpha$ and $\alpha'$ which correspond to each other. We may, for example, take $w$ equal to any of the quantities such as $\alpha$, or $\alpha'$, or sin $\alpha$ or tan $\alpha$ and by selecting a convenient parameter may assume these functions can be expressed as power series in the parameter. Thus we may assume that the function sin $\beta$ may be expressed by a power series such as $$\sin \beta = s_1 w + s_2 w^3 + s_3 w^5 \ldots \quad (30)$$

and $$p = p_1 w + p_2 w^3 + p_3 w^5 \ldots \quad (31)$$

and similarly form power series for sin $\beta'$ and $u$. This may be done by ordinarily trigonometric ray tracing by assigning values to the parameter $w$ and tracing the rays so defined forward from the axial point O into the medium immediately preceding the first aspheric surface and backwardly from the point O' into the medium immediately following the second aspheric surface. This will give us numerical values for the sin $\beta$, sin $\beta'$, $p$ and $u$ for the numerical values of the parameter chosen, and we can then fit appropriate polynomials in the parameter to this data and consider these polynomials as representing closely enough the partial power series expansions of our functions sin $\beta$, sin $\beta'$, $p$ and $u$.

The number of terms in the polynomials we obtain depends upon the number of values assigned to the parameter and the number that have to be assigned to represent our functions accurately enough over the desired range of $\alpha'$ and depends upon the maximum angle assumed for our system. Enough terms should be determined so that the condenser system when triangulated through the aspheric curves obtained should show no more than insignificant deviations from the requirements that the system have substantially no spherical aberration while giving the desired controlled slide illumination.

In this manner we will have our coordinated rays diverging from point O and converging upon point O' defined analytically as functions of a parameter $w$ by power series in the parameter. The coordination between the rays is choosen in accordance with the methods previously described for securing the desired relative illumination at the film aperture 12. It is desired to find the equations of curves which will refract the rays A and B when passing through the aspheric surfaces into coincidence with each other, for all rays within the range being considered. The preferred procedure would be to take rectangular coordinate axes through point $q'$ with one axis coinciding with the optical axis, assume that the coordinates of the aspheric curves have power series expansions in the parameter $w$ with unknown coefficients and to introduce these expansions into the mathematical equations that express our requirements. When this has been done, with the small letters $x$ and $z$ representing the coordinates of the first aspheric curve with reference to the axes through point $q$ and with the large letters X and Z representing the coordinates of the second aspheric curve these equations may be written as follows:

$$x\sqrt{1-\sin^2 \beta} - z \sin \beta = p \quad (32)$$

$$X\sqrt{1-\sin^2 \beta'} - Z \sin \beta' = u \quad (33)$$

$$(X-x)\sqrt{1-\sin^2 \gamma} - (Z-z) \sin \gamma = 0 \quad (34)$$

wherein the symbol $\gamma$ is the angle of the joining ray C in the medium between the two aspheric curves with respect to the optical axis.

When we apply Snell's law of refraction at the two aspheric surfaces, with $n$ representing the index of refraction of the medium immediately preceding the first aspheric curve and containing the ray A, N representing the index of the medium containing the ray C, and $n'$ representing the index of the medium immediately following the second aspheric curve, we may write the following equations:

$$n(x' \sin \beta + z'\sqrt{1-\sin^2 \beta}) = N(x' \sin \gamma + z'\sqrt{1-\sin^2 \gamma}) \quad (35)$$

$$n'(X' \sin \beta' + Z'\sqrt{1-\sin^2 \beta'}) = N(X' \sin \gamma + Z'\sqrt{1-\sin^2 \gamma}) \quad (36)$$

wherein the primed letters denote the differentiations of the unprimed quantities with respect to the parameter $w$. When the aspheric curves are on two adjacent lens elements the letter $N=1$, or when a single lens element such as in Fig. 4 is used $n=n'=1$. Because these equations are identities in parameter $w$, we can find the coefficients of the power series expansions for both aspheric curves and so have solved in an accurate manner for our aspheric curves.

The single aspherically surfaced element of Fig. 4, for example may be expressed by the following parametric equations for the first and second aspheric surfaces 36 and 38 thereof with the dimensions given in millimeters.

$$\#1\begin{cases} \dfrac{X}{100}=.75w+.7346182w^3+.9049424w^5 \\ \dfrac{Z}{100}=.1196182w^2+.2040055w^4+.3869282w^6 \end{cases}$$

$$\#2\begin{cases} \dfrac{X}{100}=1.0092811w+.2077288w^3+.1200166w^5 \\ \dfrac{Z}{100}=1.0027076w^2-.5793206w^4-.2584880w^6 \end{cases}$$

In the above curve equations (as well as in the curve equations given below) the X and Z coordinates refer to the vertices of the aspheric surfaces as origins, with the Z axis coinciding with the optical axis.

A lens bearing the above aspheric surfaces and provided with a center thickness of 47.4 mm. may be located a distance of 75 mm. from the light source and an image of the light source will be located a distance of 487.2 mm. from the opposite side of the condenser and will provide a magnification of approximately 4.8. In this case a glass having a refractive index of 1.5235 was employed. The relative illumination function $J(r)$ desired will be $1+29.82\tan^2\alpha'$ and when an angle of 6.6° is used the edge illumination (tan .116) will be 1.4 times as intense as the central or axial point at aperture 12.

A lens system of the design shown in Fig. 5 may have aspheric surfaces 40 and 42 having parameteric equations therefor as follows, with the dimensions being given millimeters:

$$\#1\begin{cases} \dfrac{X}{100}=.8975988w+.5115201w^3-.3490878w^5 \\ \dfrac{Z}{100}=.5516834w^2-2.5815423w^4+1.8305707w^6 \end{cases}$$

$$\#2\begin{cases} \dfrac{X}{100}=.9635497w+.0701409w^3-.0531244w^5 \\ \dfrac{Z}{100}=.2580284w^2-1.8464339w^4+5.6630463w^6 \end{cases}$$

A lens system having the above equations for surfaces 40 and 42 may be arranged with the other elements proportioned as indicated by the following table:

$t_a=29.7$ mm.  $r_a=\infty$
$t_b=18.5$ mm.  $r_b=1.80$ mm.
$t_c=21$ mm.  $n_a=1.5235$ This condenser system will have a distance of 70.27 mm. from the first surface thereof to the light source and a distance of 470.17 mm. from the last surface to the image. The system will provide the same magnification as that specified for the single element system of Fig. 4. The relative illumination function $J(r)$ desired will be $1+29.82\tan^2\alpha'$ and when an angle of approximately 5½ degrees is used the edge illumination 1.26 times as great as the center illumination will be provided.

The lens system shown by Fig. 6 may be provided with aspheric surfaces 47 and 48 and these two surfaces may be calculated from the following equations, respectively, in which the parameter $w$ has been eliminated:

$$Z=-.7880495x^2-.4278425x^4-.4582494x^6$$
and
$$Z=.3389581x^2-.1351760x^4-.0157740x^6$$

These equations give the dimensions in inches.

When such aspheric curves are used upon the lens system of Fig. 6 having its other values as follows:

$t_a=16.94$ mm.  $n_a=1.519$
$t_b=2.125$ mm.  $r_a=\infty$
$t_c=7.41$ mm.  $r_c=\infty$ a distance of 15 mm. from the first surface to the light source and a distance of 122.28 mm. from the last surface to the image thereof will be provided, with the system giving a magnification of approximately 4.8. The maximum angle for $\alpha'$ will be approximately 5°. The relative illumination function in this example is chosen so as to give a few per cent increase at the outer edge as compared to the center illumination.

A condenser lens system of the type shown at Fig. 7 may be formed with aspheric surfaces 44 and 46 using the parametric equations of the following table:

$$\#1\begin{cases} \dfrac{X}{50}=.9750562w+.1472191w^3+.0327066w^5+ \\ \qquad .1011303w^7-.0301995w^9+.0447262w^{11} \\ \dfrac{Z}{50}=-.2990233w^2-.2416547w^4+.0275000w^6- \\ \qquad .1060255w^8+.0927791w^{10}+.0059979w^{12} \end{cases}$$

$$\#2\begin{cases} \dfrac{X}{50}=1.1756778w-.0631767w^3+.0361453w^5- \\ \qquad .0276316w^7+.0336463w^9-.0326100w^{11} \\ \dfrac{Z}{50}=.4652559w^2-.2625312w^4+.2017572w^6- \\ \qquad .2468244w^8+.3118309w^{10}-.2152980w^{12} \end{cases}$$

These equations give dimensions in millimeters.

When this system is proportioned as indicated in the following table:

$t_a=26.5$ mm.  $n_d=1.5235$
$t_b=1$ mm.  $r_a=\infty$
$t_c=22.5$ mm.  $r_b=45.0$ mm.
$t_d=48.0$ mm.  $r_c=\infty$
$t_e=14.5$ mm.  $r_d=\infty$ it will have a distance of 23.0 mm. from the front lens surface to the light source and a distance of 276.8 mm. from the last lens surface to the image of the light source. The system will provide a magnification of 4.37 and will have a maximum value for $\alpha'$ of approximately 8.4 degrees. In this example the relative illumination function $J(r)$ is substantially equal to 1. This condition is useful with an objective having very little vignetting effect, thus giving a substantially uniform screen illumination.

In the above examples (Figs. 4, 5, 6 and 7) the letters $t_a$, $t_b$, $t_c$, $t_d$ and $t_e$ indicate axial thickness of lenses or axial spacings therebetween, $r_a$, $r_b$, $r_c$ and $r_d$ are radii of the surfaces indicated and $n_d$ is the index of refraction of the glass employed.

In all four examples given above the relative intensity function $I(\alpha)$ has been taken equal to $\cos\alpha$ and the light losses due to reflection have been disregarded.

Figure 10:
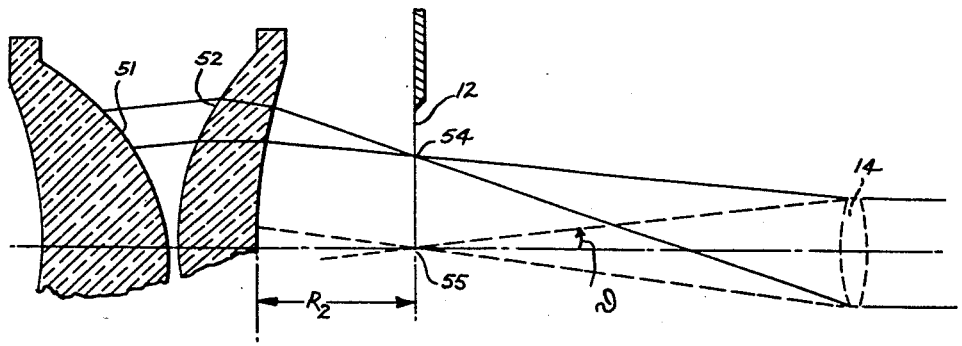
Fig. 10 is a fragmentary cross-sectional view of another form of condenser lens system and an associated film gate and objective for showing how certain conditions of system may be calculated.

When the projection aperture 12 is spaced a sufficient amount from the last surface of the condenser system, as indicated by $R_2$ in Fig. 10, small ripples or local imperfections in the aspheric surfaces will not materially affect the distribution of light upon the film being projected. That is, when the aperture 12 is sufficiently spaced from the condenser system small surface ripples or the like, such as might occur for example, adjacent points 51 or 52 upon either molded aspheric surface may be allowed if the cone 53 of light illuminating any point 54 in the aperture 12 comes from a relatively large portion of the condenser lens system in comparison to the surface area of the imperfection included in said portion. This means that the required aspheric surface quality may be decreased if the distance $R_2$ is increased. However, $R_2$ must not be so large that the required diameter of the condenser element or elements is increased unduly. In a general way it might be stated that $R_2$ is preferably chosen according to the criterion:

$$R_2 \tan \zeta > 2.0 \quad (37)$$

where $\zeta$ is the half angle subtended by the objective at the optical axis point 55 in the aperture 12. Since the angles $\zeta$ which are encountered in practice are so small that tan $\zeta$ approaches sin $\zeta$ which equals the numerical aperture (N. A.) of the objective we may usually employ the approximate formula $$R_2 \times \text{N. A.} > 2.0 \quad (38)$$

Accordingly, it has been found not only feasible but highly practical from a commercial standpoint to mold the aspheric surfaces by the use of properly formed and finished concaved ceramic molds, or the equivalent.

For example, the surfaces 47 and 48 in Fig. 6 may be formed by moldings, in which case a peripheral flange 49 may also be formed upon the lens element. The thickness of a molded lens element is purposely made somewhat greater than that required for the value of $t_a$ and thus the thickness of flange 49 will also be oversized. However, since the flat surface 49' will be formed at the time of molding, it will serve as a definite reference plane and may be used during the "grinding down" of the plano surface 50 of this lens element to produce the required thickness $t_a$. Such procedure of course will remove the unfinished upper surface of the cast lens element with the result that the surface 50 will be accurately finished. In like manner all of the aspherically curved lens elements shown by Figs. 5, 6, 7, 8 and 10 of the drawing may be molded to produce an aspheric surface and then ground and polished to produce a second plano or spherical surface thereon.

Any of these aspheric surfaces could also be formed by much more laborious and expensive grinding and polishing processes, as could also the doubly aspheric element of Fig. 4. However, it might be more feasible and fully as satisfactory, optically, to provide, in place of a single element having two aspheric surfaces, two lens elements with adjacent plano or mating spherical surfaces (see Fig. 8) which will be placed together and cemented if desired or in slightly spaced relation, in which case a lens system substantially the equivalent to that of Fig. 4 could be readily and economically made by the molding and finishing method just described. Of course, the plano or spherical surfaces thereof would be formed by grinding and polishing using as references the flat surfaces 56 and 58 adjacent the aspheric curves.

In the lens system shown by Fig. 6, when employed to illuminate a film gate aperture of approximately 21 mm. across the diagonal, it has been found advantageous to position the projection aperture a working distance ($R_2$) of approximately 30 mm. from the condenser system. In the system shown by Fig. 7, when employed to illuminate a film aperture of approximately 70 mm. across the diagonal a suitable distance for $R_2$ has been found to be approximately of 25 mm. It might be imagined that in cases where the diagonal of the film aperture can be made of less size the working distance ($R_2$) might be increased as much as desired without detrimental effect, so long as the aperture 12 is adequately filled with light. However, it must be kept in mind that these condenser systems were designed to work with specific objectives, which objectives are to project images of the picture or slide at a predetermined magnification or range of magnifications and if we change $R_2$ we must move the associated objective accordingly to keep the slide at the same distance from the objective, and then the filament image will not be properly placed relative to the objective. Furthermore, the relative illumination function $J(r)$ changes as $R_2$ is changed.

Throughout the preceding description reference has been made to the invention being particularly useful for condenser lens systems of medium and high speeds. This is true because when the maximum value for $\alpha$ for any particular system is large and when the Abbe sine condition is satisfied, proper control of the illumination at the film aperture 12 will not be obtained. Or in other words if, under such conditions, this maximum acceptance angle $\alpha$ is large, for example exceeding 20 degrees, the illumination at the film aperture 12 will fall off noticeably toward the outer edges, thus failing to provide a uniform aperture illumination. As this maximum angle exceeds 20 degrees this center to edge aperture illumination will fall off with increasing rapidity as angle $\alpha$ is increased. In condenser lens systems made in accordance with the present invention, the maximum acceptance angle $\alpha$ can be 55 degrees or more while maintaining a substantially uniform illumination at aperture 12 or, if desired, this illumination may even be increased toward the edges of the aperture so as to compensate for the optical characteristics of the associated projection objective and thus provide upon the viewing screen a substantially uniform illumination.

It will be apparent from a careful consideration of the invention as described above that a great many different arrangements and combinations of condenser lens systems may be used in the carrying out of the present invention and, accordingly, the several details of the specific systems mentioned above should be considered by way of illustration only.

Having described our invention, we claim:

1. A condenser lens system for use in a projection device and adapted to control the direction and distribution of light rays at the projection aperture of said projection device, said condenser lens system having conjugate object and image planes spaced a predetermined finite axial distance apart, said system comprising convergent lens means of predetermined refractive properties and embodying optically aligned refracting surfaces intersecting the optical axis of said system at given locations and with two of said refractive surfaces being adjacent correlated aspherically shaped surfaces having their verticies arranged in predetermined axially aligned and spaced relation to each other, said convergent lens means being constructed and arranged to collect light from a relatively small light source axially located at said object plane a predetermined distance therefrom and to focus said light at said image plane as an image of predetermined magnification, the first surface of said pair of aspheric surfaces being of such varying curvature as to direct the light rays received from said source toward said second aspheric surface in a controlled manner to effect a predetermined zonal distribution of the light rays thereon, and said second aspheric surface being of such predetermined varying curvature as to refract the rays so received in such predetermined directions that they provide, upon leaving the condenser lens system, a controlled zonal light distribution at the plane of the projection aperture intermediate the convergent lens means of said system and said image plate, said system being substantially free from spherical aberration.

2. A condenser lens system for use in a projection device and adapted to control the direction and distribution of light rays at the projection aperture of said projection device, said condenser lens system having conjugate object and image planes spaced a predetermined finite axial distance apart, said system comprising a plurality of convergent lens elements having adjacent correlated aspherically shaped surfaces having their verticies arranged in predetermined axial relation to each other, said lens elements being constructed and arranged to collect light from a relatively small axially aligned light source located at said object plane a predetermined distance therefrom and to focus said light at said image plane as an image of predetermined magnification, the first aspheric surface of said pair being of such varying curvature as to direct the light rays received from said light source toward said second aspheric surface in a controlled manner to effect a predetermined zonal distribution of the light rays thereon, and said second aspheric surface being of such predetermined varying curvature as to refract the rays so received in such predetermined directions that they provide, upon leaving the condenser lens system, a controlled zonal distribution at the plane of the projection aperture intermediate the convergent lens means of said system and said image plane, said system being substantially free from spherical aberration.

3. The method of forming a condenser lens system for use in a film projector or the like, said system having at least a pair of axially aligned lens elements, comprising forming by a molding technique a first lens blank having a molded aspherically shaped refracting surface and an adjacent reference shoulder thereon, grinding and polishing an opposed portion of said blank to predetermined optical specifications to provide a second refracting surface at a predetermined axial distance from said molded surface, forming by a molding technique a second lens blank having a different molded aspherically shaped refracting surface and an adjacent reference shoulder thereon, grinding and polishing an opposed portion of said second blank to predetermined optical specifications to provide a second refracting surface thereon at a predetermined axial distance from the molded surface thereon, and positioning the lens elements so formed in optical alignment and in predetermined axially aligned adjacent relation so as to effect a condenser system which will form an image of predetermined magnification substantially free from spherical aberration, at a predetermined image plane when a light source is axially positioned at a predetermined object plane of said system, and with the image forming rays providing at an aperture intermediate the system and said image plane a controlled illumination for all portions of said aperture.

4. A condenser lens system for use in an optical projection device, said condenser lens system having conjugate object and image planes spaced a predetermined finite axial distance apart, said condenser system comprising lens means of predetermined refractive properties and embodying optically aligned refracting surfaces intersecting the optical axis of said system at given locations and with two of said refractive surfaces being aspheric surfaces, said aspheric surfaces being so constructed and arranged and correlated in predetermined axially aligned relation to each other and curved in accordance with the refractive indices of the media to be traversed by the light rays through said system that said condenser system effects a desired controlled zonal light redistribution between said surfaces, when a cosine light source is axially positioned at said object plane a predetermined distance therefrom, will form an image of said light source of predetermined magnification and substantially free from spherical aberration at said image plane, and will provide over substantially all portions of a predetermined projection area intermediate said image plane and said condenser system a controlled light distribution, with each image-forming ray at said projection area and the corresponding ray in the object space being so related that the equation $$\sin^2 \alpha = \int_0^{(M \tan \alpha')^2} J(r) d(M \tan \alpha')^2$$

will be substantially satisfied; when M is the magnification of the system, $\alpha'$ is the angle of the image-forming ray with reference to the optical axis of the system, $\alpha$ is the angle of the corresponding ray in the object space with reference to said optical axis, and $J(r)$ is the predetermined variation in the relative illumination ratio from center to edge at said projection area.

5. A condenser lens system for use in an optical projection device, said condenser lens system having conjugate object and image planes spaced a predetermined finite axial distance apart, said condenser system comprising a plurality of lens elements having predetermined refractive indices and of predetermined correlated aspheric surfaces arranged on different lens elements, said aspheric surfaces being so constructed and arranged in predetermined axially aligned relation to each other that said condenser system effects a desired controlled zonal light redistribution between said surfaces, when a cosine light source is positioned at said object plane a predetermined distance therefrom, will form an image of said light source of predetermined magnification and substantially free from spherical aberration at said image plane, and will provide over all portions of a projection area intermediate said image plane and said condenser system controlled illumination, with each image-forming ray at said projection area and the corresponding ray in the object space being so related that the equation $$\sin^2 \alpha = \int_0^{(M \tan \alpha')^2} J(r) d(M \tan \alpha')^2$$

will be substantially satisfied; when M is the magnification of the system, $\alpha'$ is the angle of the image-forming ray with reference to the optical axis of the system, $\alpha$ is the angle of the corresponding ray in the object space with reference to said optical axis, and $J(r)$ is the predetermined variation in the relative illumination ratio from center to edge at said projection area.

6. The method of forming a condenser lens system for use in a film projector or the like, said system having at least a pair of lens elements, comprising forming by a molding technique a first lens blank having a molded refracting surface of predetermined aspheric curvature thereon and an integral reference surface adjacent and angularly disposed relative thereto, grinding and polishing an opposed portion of said blank to predetermined optical specifications, while using said reference surface and aspheric surface as positioning means, to provide a second co-related refracting surface at a predetermined axial distance from said first aspheric surface, forming by a molding technique a second lens blank having a different molded refracting surface of predetermined aspheric curvature thereon and an integral reference surface adjacent and angularly disposed relative thereto, grinding and polishing an opposed portion of said second blank to predetermined optical specifications, while using said second reference surface and said second aspheric surface as positioning means, to provide a second co-related refracting surface on said second blank a predetermined axial distance from the aspheric surface thereon, and positioning the lens elements so formed in optical alignment and in predetermined axially aligned adjacent relation so as to effect a condenser system which will form an image of predetermined magnification substantially free from spherical aberration at a predetermined image plane when a relatively small light source is positioned in axial alignment therewith at an object plane a predetermined distance from said system, and with the image forming rays providing at a projection area intermediate the condenser system and said image plane predetermined illumination for substantially all portions of said projection area.

7. A condenser lens system for use in an optical projection device, said condenser lens system having conjugate object and image planes spaced a predetermined finite axial distance apart, said condenser system comprising lens means of predetermined refractive properties and embodying optically aligned refracting surfaces intersecting the optical axis of said system at given locations and with two of said refractive surfaces being aspheric surfaces, said aspheric surfaces being so constructed and arranged and correlated in predetermined axially aligned relation to each other that said condenser system effects a desired controlled zonal light redistribution between said surfaces, when a relatively small predetermined light source is positioned at said object plane a predetermined distance therefrom, will form an image of said light source of predetermined magnification and substantially free from spherical aberration at said image plane, and will provide at a predetermined projection area intermediate said image plane and the last refracting surface of said condenser system a controlled light distribution which increases in accordance with the equation $$J(r) = \frac{1}{\cos^2 \alpha'}$$

from the center to the edge of said aperture when $r = R_1 \tan \alpha'$, and with each image-forming ray at said projection aperture and the corresponding ray in the object space being so related that the equation $$\sin \alpha = M \tan \alpha' \left(1 + \frac{M^2}{2} \tan^2 \alpha'\right)^{\frac{1}{2}}$$

will be substantially satisfied; when M is the magnification of the system, $\alpha'$ is the angle of the image-forming ray with reference to the optical axis of the system, $\alpha$ is the angle of the corresponding ray in the object space with reference to said optical axis, $J(r)$ is the predetermined variation in the relative illumination ratio from center to edge at said projection area, $R_1$ is the axial distance from the image plane to said projection area and $r$ is the radial distance from the image forming ray to the optical axis taken at said projection area.

8. A condenser lens system for use in an optical projection device, said condenser lens system having conjugate object and image planes spaced a predetermined finite axial distance apart, said condenser system comprising a plurality of lens elements having predetermined refractive indices and having refractive surfaces intersecting the optical axis of said system at given locations and with two of said refractive surfaces of said elements being aspheric surfaces of predetermined correlated aspherical curvatures arranged on different lens elements, said aspheric surfaces being so constructed and arranged in predetermined axially aligned spaced relation to each other that said condenser system effects a desired controlled zonal light redistribution between said surfaces, when a relatively small predetermined light source is positioned at said object plane a predetermined distance therefrom, will form an image of said light source of predetermined magnification and substantially free from spherical aberration at said image plane, and will provide at a projection aperture intermediate said image plane and the last refracting surface of said condenser system controlled illumination which increases in accordance with the equation $$J(r) = \frac{1}{\cos^2 \alpha'}$$

from the center to the edge of said aperture when $r = R_1 \tan \alpha'$, with each image-forming ray at said projection aperture and the corresponding ray in the object space being so related that the equation $$\sin \alpha = M \tan \alpha' \left(1 + \frac{M^2}{2} \tan^2 \alpha'\right)^{\frac{1}{2}}$$

will be substantially satisfied; when M is the magnification of the system, $\alpha'$ is the angle of the image-forming ray with reference to the optical axis of the system, $\alpha$ is the angle of the corresponding ray in the object space with reference to said optical axis, $J(r)$ is the predetermined variation in the relative illumination ratio from center to edge at said projection aperture, $R_1$ is the axial distance from the image plane to said projection aperture, and $r$ is the radial distance from the image-forming ray to the optical axis taken at said projection aperture.

9. A condenser lens system for use in an optical projection device, said condenser lens system having conjugate object and image planes spaced a predetermined finite axial distance apart, said condenser system comprising lens means of predetermined refractive properties and embodying optically aligned refracting surfaces intersecting the optical axis of said system at given locations and with two of said refractive surfaces being aspheric surfaces, said aspheric surfaces being so constructed and arranged and correlated in predetermined axially aligned relation to each other that said condenser system effects a desired controlled zonal light redistribution between said surfaces, when a relatively small predetermined light source is positioned at said object plane a predetermined distance therefrom, will form an image of said light source of predetermined magnification and substantially free from spherical aberration at said image plane, and will provide at a predetermined projection aperture intermediate said image plane and the last refracting surface of said condenser system a controlled zonal light distribution over all portions thereof, with each image-forming ray at said projection aperture and the corresponding ray in the object space being so related that the equation $$\int_0^\alpha I(\alpha) \sin \alpha d\alpha = \int_0^{(M \tan \alpha')^2} J(r) d(M \tan \alpha')^2$$

will be substantially satisfied; when M is the magnification of the system, $\alpha'$ is the angle of the image-forming ray with reference to the optical axis of the system, $\alpha$ is the angle of the corresponding ray in the object space with reference to said optical axis, $J(r)$ is the predetermined variation in the relative illumination ratio from center to edge of said projection aperture, and $I(\alpha)$ is the relative intensity of the light source.

10. A condenser lens system for use in an optical projection device, said condenser lens system having conjugate object and image planes spaced a predetermined finite axial distance apart, said condenser system comprising a plurality of lens elements having predetermined refractive indices and having refractive surfaces intersecting the optical axis of said system at given locations and with two of said refractive surfaces of said elements being aspheric surfaces of predetermined correlated aspherical curvatures arranged on different lens elements, said aspheric surfaces being so constructed and arranged in predetermined axially aligned relation to each other that said condenser system effects a desired controlled zonal light redistribution between said surfaces, when a relatively small predetermined light source is positioned at said object plane a predetermined distance therefrom, will form an image of said light source of predetermined magnification and substantially free from spherical aberration at said image plane, and will provide at a projection aperture intermediate said image plane and the last refracting surface of said condenser system controlled illumination, with each image-forming ray at said projection aperture and the corresponding ray in the object space being so related that the equation $$\int_0^\alpha I(\alpha) \sin \alpha d\alpha = \int_0^{(M \tan \alpha')^2} J(r) d(M \tan \alpha')^2$$

will be substantially satisfied; when M is the magnification of the system, $\alpha'$ is the angle of the image-forming ray with reference to the optical axis of the system, $\alpha$ is the angle of the corresponding ray in the object space with reference to said optical axis, $J(r)$ is the predetermined variation in the relative illumination ratio from center to edge of said projection aperture, and $I(\alpha)$ is the relative intensity of the light source.

11. A condenser lens system for use in an optical projection device having a projection objective of predetermined vignetting characteristics, said condenser lens system having conjugate object and image planes spaced a predetermined finite axial distance apart, said condenser system comprising lens means of predetermined refractive properties and embodying optically aligned refracting surfaces intersecting the optical axis of said system at given locations and with two of said refractive surfaces being aspheric surfaces, said aspheric surfaces being so constructed and arranged and correlated in predetermined axially aligned relation to each other that said condenser system effects a desired controlled zonal light redistribution between said surfaces, when a relatively small light source of predetermined emission characteristics is positioned at said object plane a predetermined distance therefrom, will form an image of said light source of predetermined magnification and substantially free from spherical aberration at said image plane, and will provide at a predetermined projection aperture intermediate said image plane and the last refracting surface of said condenser system an illumination which increases from the center to the edge of said aperture in a manner to compensate for the vignetting of said objective and provide a substantially uniform illumination upon an associated viewing screen, with each image-forming ray at said projection aperture and the corresponding ray in the object space being so related that the equation $$\int_0^\alpha I(\alpha) \sin \alpha d\alpha = \int_0^{(M \tan \alpha')^2} J(r) d(M \tan \alpha')^2$$

will be substantially satisfied; when M is the magnification of the system, $\alpha'$ is the angle of the image-forming ray with reference to the optical axis of the system, $\alpha$ is the angle of the corresponding ray in the object space with reference to said optical axis, and $J(r)$ is the predetermined variation in the relative illumination ratio from center to edge of said projection aperture, and $I(\alpha)$ is the relative intensity of the light source.

12. A condenser lens system for use in an optical projection device having a projection objective of predetermined vignetting characteristics, said condenser lens system having conjugate object and image planes spaced a predetermined finite axial distance apart, said condenser system comprising a plurality of lens elements having predetermined refractive indices and having refractive surfaces intersecting the optical axis of said system at given locations and with two of said refractive surfaces of said elements being aspheric surfaces of predetermined correlated aspherical curvatures arranged on different lens elements, said aspheric surfaces being so constructed and arranged in predetermined axially aligned relation to each other that said condenser system effects a desired controlled zonal light redistribution between said surfaces, when a relatively small light source of predetermined emission characteristics is positioned at said object plane a predetermined distance therefrom, will form an image of said light source of predetermined magnification and substantially free from spherical aberration at said image plane, and will provide at a predetermined projection aperture intermediate said image plane and the last refracting surface of said condenser system an illumination which increases from the center to the edge of said aperture in a manner to compensate for the vignetting of said objective and provide a substantially uniform illumination upon an associated viewing screen, with each image-forming ray at said projection plane and the corresponding ray in the object space being so related that the equation $$\int_0^\alpha I(\alpha) \sin \alpha d\alpha = \int_0^{(M \tan \alpha')^2} J(r) d(M \tan \alpha')^2$$

will be substantially satisfied; when M is the magnification of the system, $\alpha'$ is the angle of the image-forming ray with reference to the optical axis of the system, $\alpha$ is the angle of the corresponding ray in the object space with reference to said optical axis, and $J(r)$ is the predetermined variation in the relative illumination ratio from center to edge of said projection aperture, and $I(\alpha)$ is the relative intensity of the light source.

13. A condenser lens system for use in a projection device, said condenser lens system having conjugate object and image planes spaced a predetermined finite axial distance apart, said condenser system comprising lens means of predetermined refractive properties and embodying optically aligned refracting surfaces intersecting the optical axis of said system at given locations and with two of said refractive surfaces being aspheric surfaces, said aspheric surfaces being so constructed and arranged and correlated in predetermined axially aligned relation to each other that said condenser system effects a desired controlled zonal light redistribution between said surfaces, when a light source of very small dimensions and substantially uniform emission characteristics is positioned at said object plane a predetermined distance from said system, will form an image of said light source of predetermined magnification and substantially free from spherical aberration at said image plane, and will provide over all portions of a predetermined projection plane intermediate said image plane and the last refracting surface of said condenser system a controlled zonal light distribution, with each image-forming ray at said projection plane and the corresponding ray in the object space being so related that the equation $$2 \sin\left(\frac{\alpha}{2}\right) = M \tan \alpha'$$

will be substantially satisfied; when $M$ is the magnification of the system, $\alpha'$ is the angle of the image forming ray with reference to the optical axis of the system and $\alpha$ is the angle of the corresponding ray in the object space with reference to said optical axis.

14. A condenser lens system for use in an optical projection system, said condenser lens system having conjugate object and image planes spaced a predetermined finite axial distance apart, said condenser lens system comprising lens means of predetermined refractive properties and embodying optically aligned refracting surfaces intersecting the optical axis of said system at given locations and with two of said refractive surfaces being aspheric surfaces having predetermined correlated aspherical curvatures, said aspheric surfaces being so constructed and arranged in predetermined axially aligned relation to each other that said condenser system effects a desired controlled zonal light redistribution between said surfaces, when a relatively small light source having emission characteristics substantially satisfying the equation $I(\alpha) = (1-Q) \cos \alpha + Q \cos^2 \alpha$ is positioned at said object plane a predetermined distance therefrom, will form an image of said light source of predetermined magnification and substantially free from spherical aberration at said image plane, and will provide at a predetermined projection aperture intermediate said image plane and said condenser system a controlled zonal light distribution over all parts of said projection aperture, and with each image-forming ray at said aperture and the corresponding ray in the object space being so related that the equation $$M \tan \alpha' = \left[(1-Q) \sin^2 \alpha + \frac{2Q}{3}(1-\cos^3 \alpha)\right]^{\frac{1}{2}}$$

will be substantially satisfied; when $M$ is the magnification of the system, $\alpha'$ is the angle of the image-forming ray with reference to the optical axis of the system, $\alpha$ is the angle of the corresponding ray in the object space with reference to the optical axis, $I(\alpha)$ is the relative intensity at the aperture, and $Q$ is a constant characteristic of the light source.

15. A condenser lens system for use in an optical projection device, said condenser lens system having conjugate object and image planes spaced a predetermined finite axial distance apart, said condenser lens system comprising lens means of predetermined refractive properties and embodying optically aligned refracting surfaces intersecting the optical axis of said system at given locations and with two of said refractive surfaces being correlated aspherical surfaces in predetermined axially aligned relation, said aspherical surfaces having such curvatures that said system effects a desired controlled zonal light redistribution between said surfaces, when a light source of relatively small dimensions is axially positioned at said object plane a predetermined distance from said system, will direct light toward said conjugate image plane at a predetermined distance therefrom and will provide an image of predetermined magnification, while providing a controlled zonal illumination at a projection aperture intermediate the last refracting surface of said system and said image plane and located a predetermined distance from the latter, said controlled zonal illumination having a relative illumination function adjacent the edge of said aperture which is from approximately 1 to 1.5 times the illumination function at the center of said aperture, said system being corrected so as to be substantially free from spherical aberration, the axial spacing between said correlated aspherical surfaces serving to accurately control the zonal distribution of the light therebetween.

16. A condenser lens system for use in an optical projection device, said condenser lens system having conjugate object and image planes spaced a predetermined finite axial distance apart, said condenser lens system comprising a plurality of convergent lens elements of predetermined refractive indices and having refractive surfaces intersecting the optical axis of said system at given locations, a pair of adjacent surfaces being correlated aspherical surfaces formed on said lens elements and disposed in predetermined axially aligned and spaced relation, said aspherical surfaces having such curvatures that said system effects a desired controlled zonal light redistribution between said surfaces, when a light source of relatively small dimensions and predetermined emission characteristics is axially positioned at said object plane a predetermined distance from said system, will direct light toward said conjugate image plane at a predetermined distance therefrom and will provide an image of predetermined magnification, while providing a controlled illumination at a projection aperture intermediate the last refracting surface of said system and said image plane and located a predetermined distance from the latter, said controlled illumination having a relative zonal illumination function adjacent the edge of said projection aperture which is from approximately 1 to 1.5 times the zonal illumination function at the center of said aperture.

17. A condenser lens system for use in an optical projection device having a projection objective of predetermined optical characteristics, said condenser lens system having conjugate object and image planes spaced a predetermined finite axial distance apart, said condenser lens system comprising lens means of predetermined refractive properties and embodying optically aligned refracting surfaces intersecting the optical axis of said system at given locations and with two of said refractive surfaces being correlated aspherical surfaces in predetermined axially spaced aligned relation, said aspherical surfaces having such curvatures that said system effects a desired controlled zonal light redistribution between said surfaces, when a light source of relatively small dimensions is axially positioned at said object plane a predetermined distance from said system, will direct light toward said conjugate image plane at a predetermined distance therefrom and will provide an image of predetermined magnification, while providing a controlled zonal illumination at a projection aperture intermediate last refracting surface of said system and said image plane, said projection aperture being so spaced from said condenser system that the numerical value of $R_2 \tan \zeta$ is equal to or greater than 2, when $R_2$ is the axial distance from said aperture to the last surface of said condenser system and $\zeta$ is the half angle at the aperture subtended by the projection objective, said controlled illumination having a relative zonal illumination function adjacent the edge of said aperture which is from approximately 1 to 1.5 times the relative zonal illumination function at the center of said aperture, said condenser system being corrected so as to be substantially free from spherical aberration.

18. A condenser lens system for use in an optical projection device having a projection objective of predetermined optical properties, said condenser lens system having conjugate object and image planes spaced a predetermined finite axial distance apart, said condenser system comprising lens means of predetermined refractive properties and embodying optically aligned refracting surfaces intersecting the optical axis of said system at given locations and with two of said refractive surfaces being correlated aspherical surfaces in predetermined axially aligned relation, said aspherical surfaces having such curvatures that said system effects a desired controlled zonal light redistribution between said surfaces, when a light source of relatively small dimensions is axially positioned at said object plane a predetermined distance from said system, will direct light toward said conjugate image plane at a predetermined distance therefrom and will provide an image of predetermined magnification, while providing a controlled zonal illumination at a projection aperture intermediate the last refracting surface of said condenser system and said image plane, said projection aperture being so spaced from said condenser system that the numerical value of the axial distance from the projection aperture to the condenser system times the numerical aperture of the objective will be approximately equal to or greater than 2, and said controlled zonal illumination having a relative illumination function adjacent the edge of said projection aperture which is from approximately 1 to 1.5 times the relative illumination function at the center of said projection aperture, said condenser system being corrected so as to be substantially free from spherical aberration.

19. The method of forming a condenser lens element for use in a projector or the like, comprising the steps of forming by a molding technique a lens blank having a molded aspherically shaped refracting surface and an adjacent integral reference surface angularly disposed relative thereto so as to constitute together positioning means, and grinding and polishing an opposed portion of said blank to predetermined optical specifications co-related to the axis of said aspheric surface and angularly disposed reference surface, while using said reference surface and aspheric surface jointly as said positioning means, to provide a second refracting surface at a predetermined axial distance from and axially aligned with said molded aspheric surface.

20. A condenser lens system for use in an optical projection device, said condenser lens system having conjugate object and image planes spaced a predetermined finite axial distance apart, said condenser system comprising lens means of predetermined refractive properties and embodying optically aligned refractive surfaces intersecting the optical axis of said system at given locations and with two of said refractive surfaces being correlated aspheric surfaces, said aspheric surfaces being so constructed and arranged and correlated in predetermined axially spaced aligned relation to each other and curved in accordance with the refractive indices of the media to be traversed by light rays through said system that said condenser system, when an axially aligned light source is positioned at said object plane a predetermined distance therefrom, will form an image of said light source of predetermined magnification and substantially free from spherical aberration at said image plane, and will provide over all portions of a predetermined projection area intermediate said image plane and the last refractive surface of said condenser system a controlled zonal light distribution, with each image-forming ray at said projection area and the corresponding ray in the object space being so related that the equation $\sin a = M \tan a'$ will be substantially satisfied; when M is the magnification of the system, $a'$ is the angle of the image-forming ray with reference to the optical axis of the system and $a$ is the angle of the corresponding ray in the object space with reference to said optical axis; the axial spacing between said correlated aspheric surfaces serving to accurately control the zonal distribution of the light therebetween and thereby the distribution of the light leaving the last refracting surface of said condenser system.

21. A condenser lens system for use in an optical projection device, said condenser lens system having conjugate object and image planes spaced a predetermined finite axial distance apart, said condenser system comprising a plurality of lens elements having predetermined refractive indices and having refractive surfaces intersecting the optical axis of said system at given locations and with two of said refractive surfaces of said elements being correlated aspheric surfaces arranged on different lens elements thereof, said aspheric surfaces being so constructed and arranged in predetermined axially aligned relation to each other and curved in accordance with the refractive indices of the media to be traversed by light rays through said system that said condenser system, when an axially aligned light source is positioned at said object plane a predetermined distance therefrom, will form an image of said light source of predetermined magnification and substantially free from spherical aberration at said image plane, and will provide over all portions of a projection area intermediate said image plane and said condenser system a controlled light distribution, with each image-forming ray at said projection area and the corresponding ray in the object space being so related that the equation sin $\alpha = M \tan \alpha'$ will be substantially satisfied; when M is the magnification of the system, $\alpha'$ is the angle of the image forming ray with reference to the optical axis of the system and $\alpha$ is the angle of the corresponding ray in the object space with reference to said optical axis; the axial spacing between said correlated aspheric surfaces serving to accurately control the zonal distribution of the light therebetween and thereby the distribution of the light leaving the last refracting surface of said condenser system.

22. A condenser lens system, for use in an optical projection device of the type having a relatively small light source of predetermined emission characteristics when positioned at an object plane of said system, said condenser lens system having a conjugate image plane disposed a predetermined finite distance from said object plane and a picture area of predetermined size disposed at a given plane therebetween, said condenser lens system being adapted to be positioned in said device and between said picture area and said object plane and at a predetermined distance from the latter, said system comprising lens elements having at least two correlated aspherically curved lens surfaces in predetermined axially aligned and spaced relation to each other and said aspherically curved surfaces being of curvatures controlled in accordance with the indices of refraction of the media through which the light rays pass from said source at said object plane to said image plane and with the first of said surfaces being aspherically curved so as to direct the light rays in a predetermined uneven zonal distribution onto the second of said surfaces, and said second surface being of such aspherical curvature that substantially all of said rays will be directed toward said image plane and will provide at said image plane an image of predetermined magnification, and will provide a predetermined controlled zonal distribution of illumination over substantially all portions of said picture area, said lens system being corrected so as to be substantially free from spherical aberration at said image plane.

23. A condenser lens system, for use in an optical projection device of the type having a relatively small light source of predetermined emission characteristics when positioned at an object plane of said system, said system having a conjugate image plane disposed a predetermined finite distance from said object plane and a picture projection area of predetermined size disposed at a given plane therebetween, said condenser lens system being adapted to be positioned in said device and between said picture projection area and said object plane and at a predetermined distance from the latter, said condenser lens system comprising lens elements having at least two lens elements having two correlated adjacent aspherically curved lens surfaces in predetermined axially aligned and spaced relation thereon, and said aspherically curved surfaces being of curvatures controlled in accordance with the indices of refraction of said lens elements and the media through which the light rays pass from said source at said object plane to said image plane and with the first of said adjacent curved surfaces being aspherically curved to direct the light rays in a predetermined uneven zonal distribution onto the second of said adjacent curved surfaces, and said second curved surface being of such aspherical curvature that substantially all of said rays will be directed toward said image plane and will provide at said image plane an image of predetermined magnification, and will function to provide a predetermined controlled distribution of illumination over substantially all portions of said picture projection area, said lens system being corrected so as to be substantially free from spherical aberration at said image plane.

24. A condenser lens system for use in an optical projection device, said condenser lens system having conjugate object and image planes spaced a predetermined finite axial distance apart, said condenser lens system comprising a plurality of lens means of predetermined refractive properties and including optically aligned refractive surfaces intersecting the optical axis of said system at given locations and with two of said refractive surfaces being correlated aspherically curved surfaces having their vertices in predetermined spaced relation with each other, said aspherically curved surfaces each having its curvature so controlled as to shape that, when a light source of relatively small dimensions and predetermined emission characteristics is positioned in axial alignment therewith at said object plane a given distance from the first refractive surface of said system, said lens means will direct light toward said conjugate image plane at a predetermined distance from the last refractive surface of said condenser lens system, and will provide at said image plane an image of predetermined magnification, the axial spacing of said aspherically curved surfaces serving to accurately control the zonal distribution of the light rays therebetween and accordingly the predetermined controlled zonal distribution of illumination over substantially all portions of a projection area at a given plane intermediate the last refracting surface of said system and said image plane, and located a predetermined distance from the latter, said condenser lens system being further corrected so as to be substantially free from spherical aberration at said image plane and so as to provide a predetermined control over the coma present at said image plane.

25. A condenser lens system for use in an optical projection device, said condenser lens system having conjugate object and image planes spaced a predetermined finite axial distance apart, said condenser lens system comprising a plurality of condenser lens elements of known refractive indices, said condenser lens elements having a plurality of refracting lens surfaces in axially aligned relation and intersecting the optical axis of said system at a plurality of known locations, two of said lens surfaces being correlated aspherically curved lens surfaces controlled as to shape in accordance with said refractive indices, the shapes of the other of said refracting lens surfaces and the axial location of said aspherically curved lens surfaces are such that when a light source of relatively small dimensions and predetermined emission characteristics is positioned in axial alignment therewith at said object plane a given distance from the first lens surface of said system said lens elements will direct light toward said conjugate image plane at a predetermined distance from the last lens surface of said system, and will provide at said image plane an image of predetermined magnification, the axial spacing of said aspherically curved surfaces serving to accurately control the zonal distribution of the light rays therebetween and accordingly the predetermined controlled zonal distribution of illumination over substantially all portions of a projection area at a given plane intermediate the last lens surface of said system and said image plane, and located a predetermined distance from the latter, said condenser lens system being further corrected so as to be substantially free from spherical aberration at said image plane and so as to provide a predetermined control over the coma present at said image plane.

26. A condenser lens system for use in an optical projection device, said condenser lens system having conjugate object and image planes spaced a predetermined finite axial distance apart, said condenser lens system comprising a plurality of lens means of predetermined refractive properties and embodying optically aligned refractive surfaces intersecting the optical axis of said system at given axial locations and with two of said lens surfaces being first and second correlated aspherical curved lens surfaces having the vertices in predetermined spaced relation with each other, said aspherical curved surfaces each having its curvature controlled as to shape in accordance with said refractive properties of said lens means, the shape of the other of the refracting lens surfaces and the axial location of the surfaces so that said first aspherical lens surface, when a light source of relatively small dimensions and predetermined emission characteristics is positioned in axial alignment with said system at said object plane a given distance from the first lens surface of said system, will direct light rays received from the light source toward the second aspherical surface in a controlled manner as to effect a predetermined zonal distribution of the rays thereon, and said second aspherical surface being of such predetermined varying curvature as to refract the rays so received through said system and to said conjugate image plane at a predetermined distance from the last lens surface of said system and will provide at said image plane an image of predetermined magnification, the axial spacing of said aspherically curved surfaces serving to accurately control the zonal distribution of the light rays therebetween and accordingly the predetermined controlled zonal distribution of illumination over substantially all portions of a projection area at a given plane intermediate the last lens surface of said system and said image plane, and located a predetermined distance from the latter, said system being further corrected so as to be substantially free from spherical aberration at said image plane and so as to provide a predetermined control over the coma present at said image plane.

HAROLD OSTERBERG.
ROBERT M. MULLER.
RUDOLF K. LUNEBURG.

References Cited in the file of this patent

UNITED STATES PATENTS

| Number | Name | Date |
| --- | --- | --- |
| 934,579 | Straubel et al. | Sept. 21, 1909 |
| 1,143,287 | Kohler | June 15, 1915 |
| 1,174,479 | Darby | Mar. 7, 1916 |
| 1,507,212 | Silberstein | Sept. 2, 1924 |
| 1,615,674 | Beechlyn | Jan. 25, 1927 |
| 1,923,817 | Gehrke | Oct. 31, 1933 |
| 1,946,088 | Maurer | Feb. 6, 1934 |
| 2,100,290 | Lee | Nov. 23, 1937 |
| 2,140,979 | Bertele | Dec. 20, 1938 |
| 2,284,567 | French | May 26, 1942 |
| 2,314,838 | Kingston | Mar. 23, 1943 |
| 2,373,815 | Del Riccio | Apr. 17, 1945 |
| 2,479,907 | Cox | Aug. 23, 1949 |
| 2,482,698 | Tillyer | Sept. 20, 1949 |